US012439468B2

(12) United States Patent
Jung et al.

(10) Patent No.: US 12,439,468 B2
(45) Date of Patent: Oct. 7, 2025

(54) METHOD AND APPARATUS FOR LOGGING LBT FAILURE INFORMATION IN MOBILE COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/501,475

(22) Filed: Nov. 3, 2023

(65) Prior Publication Data

US 2024/0155718 A1    May 9, 2024

(30) Foreign Application Priority Data

Nov. 3, 2022 (KR) .................. 10-2022-0145430

(51) Int. Cl.
*H04W 76/18* (2018.01)
*H04W 74/0833* (2024.01)

(52) U.S. Cl.
CPC ....... *H04W 76/18* (2018.02); *H04W 74/0833* (2013.01)

(58) Field of Classification Search
CPC . H04W 76/18; H04W 74/0833; H04W 24/02; H04W 74/0808; H04W 24/08; H04W 24/10
See application file for complete search history.

(56) References Cited

U.S. PATENT DOCUMENTS 12,200,526 B2 * 1/2025 Kim ................ H04W 24/10
2022/0070928 A1   3/2022 Babaei et al.
(Continued)

FOREIGN PATENT DOCUMENTS

KR   10-2022-0123665 A    9/2022
KR   10-2023-0141245 A    10/2023
(Continued)

OTHER PUBLICATIONS

Huawei et al.; Discussion on LBT for SL-U; 3GPP TSG-RAN WG2 Meeting #119bis-e; Online; Oct. 10-19, 2022; R2-2209535; Sep. 30, 2022.
(Continued)

*Primary Examiner* — Afshawn M Towfighi
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method and an apparatus for logging listen-before-talk (LBT) failure information in a mobile communication system are provided. The operation method of a terminal in a wireless communication system includes attempting to transmit a preamble in a random access procedure via an unlicensed spectrum, in case that one or more failures of the attempting to transmit the preamble according to LBT failure is detected, generating information on random access report including a number of the one or more failures of the attempting to transmit the preamble, accessing to a base station based on the preamble after the attempting to transmit the preamble is successful, and transmitting, to the base station, the information on random access report.

12 Claims, 13 Drawing Sheets

(56) References Cited

U.S. PATENT DOCUMENTS

| | | | |
|---|---|---|---|
| 2022/0232622 A1 | 7/2022 | Chen et al. | |
| 2022/0346174 A1 | 10/2022 | Wang et al. | |
| 2022/0353914 A1* | 11/2022 | Zhang | H04W 24/10 |
| 2023/0209611 A1* | 6/2023 | Lin | H04W 74/0808 |
| | | | 370/329 |
| 2023/0319933 A1 | 10/2023 | Jung | |
| 2024/0292304 A1* | 8/2024 | Wang | H04W 36/08 |
| 2024/0340724 A1* | 10/2024 | Ramachandra | H04W 74/0833 |
| 2025/0024519 A1* | 1/2025 | Qiu | H04W 74/0833 |

FOREIGN PATENT DOCUMENTS

| | | | |
|---|---|---|---|
| WO | WO-2024060234 A1 * | 3/2024 | |
| WO | WO-2024079693 A1 * | 4/2024 | |

OTHER PUBLICATIONS

International Search Report with Written Opinion dated Feb. 13, 2024; International Appln. No. PCT/KR2023/017555.

* cited by examiner

METHOD AND APPARATUS FOR LOGGING LBT FAILURE INFORMATION IN MOBILE COMMUNICATION SYSTEM

CROSS-REFERENCE TO RELATED APPLICATION(S)

This application is based on and claims priority under 35 U.S.C. § 119(a) of a Korean patent application number 10-2022-0145430, filed on Nov. 3, 2022, in the Korean Intellectual Property Office, the disclosure of which is incorporated by reference herein in its entirety.

BACKGROUND

1. Field

The disclosure relates to a method and apparatus for logging listen-before-talk (LBT) failure information in a mobile communication system.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus by which services may be effectively provided in a mobile communication system.

Additional aspects will be set forth in part in the description which follows and, in part, will be apparent from the description, or may be learned by practice of the presented embodiments.

In accordance with an aspect of the disclosure, an operation method of a terminal in a wireless communication system is provided. The operation method includes attempting to transmit a preamble in a random access procedure via an unlicensed spectrum, based on one or more failures of the attempting to transmit the preamble according to listen-before-talk (LBT) failure being detected, generating information on random access report including a number of the one or more failures of the attempting to transmit the preamble, accessing to a base station based on the preamble after the attempting to transmit the preamble is successful, and transmitting, to the base station, the information on random access report.

In accordance with another aspect of the disclosure, a terminal in a wireless communication system is provided. The terminal includes a transceiver, and a controller operably connected to the transceiver and being configured to attempt to transmit a preamble in a random access procedure via an unlicensed spectrum, in case that one or more failures of the attempt to transmit the preamble according to listen-before-talk (LBT) failure is detected, generate information on random access report including a number of the one or more failures of the attempt to transmit the preamble, access to a base station based on the preamble after the attempt to transmit the preamble is successful, and transmit, to the base station, the information on random access report.

Various embodiments of the disclosure may provide a method and apparatus by which services can be effectively provided in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
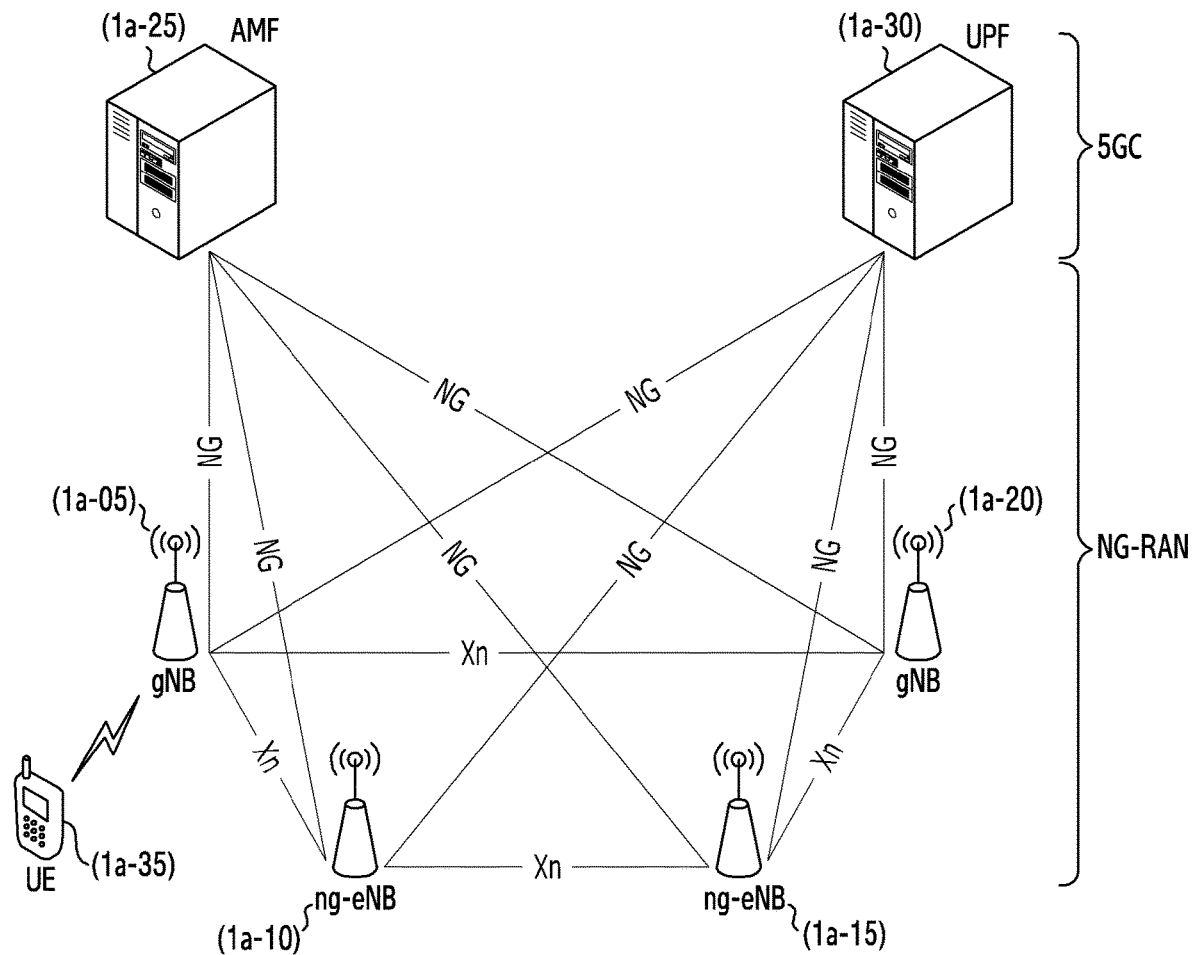
FIG. 1A illustrates a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction denotes that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the term "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit." Moreover, the elements and "units" or may be implemented to reproduce one or more CPUs within a device or a security multimedia card. Furthermore, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description of the disclosure, terms and names defined in the 3rd generation partnership project long term evolution (3GPP LTE) standards will be used for the sake of descriptive convenience. However, the disclosure is not limited by these terms and names, and may be applied in the same way to systems that conform other standards.

In the following description, a base station (BS) is an entity that allocates resources to terminals, and may be at least one of a gNode B (next generation node B, gNB), an eNode B (evolved node B, eNB), a Node B, a wireless access unit, a base station controller, and a node on a network. In the disclosure, the term "eNB" may be interchangeably used with the term "gNB." That is, a base station described as "eNB" may indicate "gNB." A terminal may include a user equipment (UE), a mobile station (MS), a cellular phone, a smartphone, a computer, or a multimedia system capable of performing communication functions. Of course, examples of the base station and the terminal are not limited thereto.

In particular, the disclosure may be applied to 3GPP NR (5th generation mobile communication standard). Furthermore, the disclosure may be applied to intelligent services (e.g., smart homes, smart buildings, smart cities, smart cars or connected cars, healthcare, digital education, retail business, security and safety-related services, etc.) on the basis of 5G communication technology and Internet of things (IoT)-related technology. In addition, the term "terminal" may refer to mobile phones, NB-IoT devices, sensors, and other wireless communication devices.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to an embodiment, eMBB aims at providing a data rate higher than that supported by existing LTE, LTE-A, or LTE-Pro. For example, in the 5G communication system, eMBB must provide a peak data rate of 20 gigabits per second (Gbps) in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 megahertz (MHz) in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 milliseconds (ms), and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The above-described three services considered in the 5G communication system, that is, eMBB, URLLC, and mMTC, may be multiplexed and transmitted in a single system. In order to satisfy different requirements of the respective services, different transmission/reception techniques and transmission/reception parameters may be used between the services. However, the above mMTC, URLLC, and eMBB are merely examples of different types of services, and service types to which the disclosure is applied are not limited to the above examples.

In the following description of embodiments of the disclosure, LTE, LTE-A, LTE Pro, 5G (or NR), or 6G systems will be described by way of example, but the embodiments of the disclosure may be applied to other communication systems having similar backgrounds or channel types. Furthermore, based on determinations by those skilled in the art, the embodiments of the disclosure may be applied to other communication systems through some modifications without significantly departing from the scope of the disclosure.

FIG. 1A illustrates a structure of an NR system used according to an embodiment of the disclosure.

Referring to FIG. 1A, the wireless communication system includes several base stations 1a-05, 1a-10, 1a-15, 1a-20, an access and mobility management function (AMF) 1a-25, and a user plane function (UPF) 1a-30. A user equipment (hereinafter referred to as UE or terminal) 1a-35 accesses an external network via the base station 1a-05, 1a-10, 1a-15, 1a-20 and UPF 1a-30.

The base stations 1a-05, 1a-10, 1a-15, 1a-20 are access nodes of a cellular network and provide wireless access to terminals accessing the network. That is, the base stations 1a-05, 1a-10, 1a-15, 1a-20 collect status information, such as buffer status, available transmission power status, and channel status of terminals to service users' traffic to perform scheduling so as to support connections between terminals and the core network (CN, in particular, NR's CN is called 5GC). Communication may include an element divided into the user plane (UP), which is related to transmission of actual user data, and the control plane (CP) for connection management, and the like. In FIG. 1A, the gNB 1a-05, 1a-20 may use UP and CP technologies defined in the NR technology, and the ng-eNB 1a-10, 1a-15 may use UP and CP technologies defined in the LTE technology although the ng-eNB 1a-10, 1a-15 is connected to 5GC.

AMF/SMF 1a-25 is a device that handles various control functions as well as mobility management functions for the terminal and is connected to multiple base stations, and UPF 1a-30 is a kind of gateway device that provides data transmission.

Figure 1B:
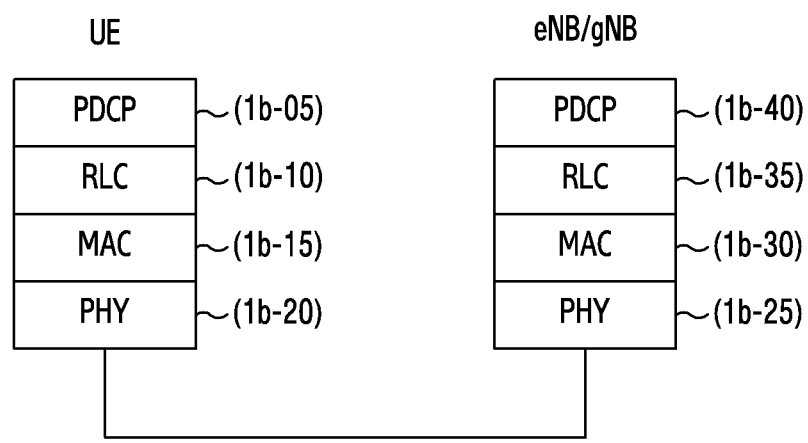
FIG. 1B illustrates a wireless protocol structure in the LTE and NR systems used according to an embodiment of the disclosure.

FIG. 1B illustrates a wireless protocol structure in the LTE and NR systems according to an embodiment of the disclosure.

Referring to FIG. 1B, the terminal and ENB include packet data convergence protocol (PDCP) 1b-05, 1b-40, radio link control (RLC) 1b-10, 1b-35, AND medium access control (MAC) 1b-15, 1b-30, respectively, in the wireless protocol of the LTE system.

The packet data convergence protocol (PDCP) 1b-05, 1b-40 performs an operation of compressing/reconstructing an IP header, and the radio link control (hereinafter referred to as RLC) 1b-10, 1b-35 reconfigures the PDCP packet data unit (PDU) to an appropriate size. The MAC 1b-15, 1b-30 is connected to several RLC layer devices configured in one terminal, and performs operations of multiplexing RLC PDUs to MAC PDUs and demultiplexing the RLC PDUs from the MAC PDUs. The physical layer 1b-20, 1b-25 channel codes and modulates the upper layer data, produces OFDM symbols and transmits the same to the wireless channel, or demodulates and channel decodes the OFDM symbols received via the wireless channel to transmit the same to the upper layer. In addition, hybrid automatic repeat request (HARQ) is used in the physical layer for additional error correction, and the receiving end transmits 1 bit to indicate whether the packet sent from the transmitting end has been received. This is called HARQ acknowledgement (ACK)/negative acknowledgement (NACK) information. For the LTE, downlink HARQ ACK/NACK information for uplink data transmission is transmitted via the physical channel hybrid-ARQ indicator channel (PHICH), and for NR, physical dedicated control channel (PDCCH), which is a channel via which downlink/uplink resource allocation, etc. are transmitted, determines whether retransmission is necessary or whether new transmission is needed to be performed, via the scheduling information of the corresponding terminal. This is because asynchronous HARQ is applied in NR. Uplink HARQ ACK/NACK information for downlink data transmission may be transmitted via a physical uplink control channel (PUCCH) or a physical uplink shared channel (PUSCH). The PUCCH is generally transmitted on the uplink of the primary cell (PCell) to be described later, but when the base station supports the terminal, the PUCCH may be transmitted to the terminal in addition to the secondary cell (SCell) to be described later, which is called PUCCH SCell.

Although not shown in FIG. 1B, radio resource control (RRC) layers are present above the PDCP layers of the terminal and the base station, respectively, and the RRC layers may send and receive connection and measurement-related configuration control messages for radio resource control.

A PHY layer may include one or more frequencies/carriers, and the technology that simultaneously configures and uses multiple frequencies is called carrier aggregation (hereinafter referred to as CA). The CA technology is a technology that replaces the use of only one carrier for communication between a terminal (or user equipment, UE) and a base station (E-UTRAN NodeB, eNB) by additionally using a main carrier and one or more secondary carriers to dramatically increase the transmission volume by the number of the secondary carriers. In LTE, a cell in a base station that uses a main carrier is called a primary cell (PCell), and a cell in a base station that uses a subcarrier is called a secondary cell (SCell).

Figure 1C:
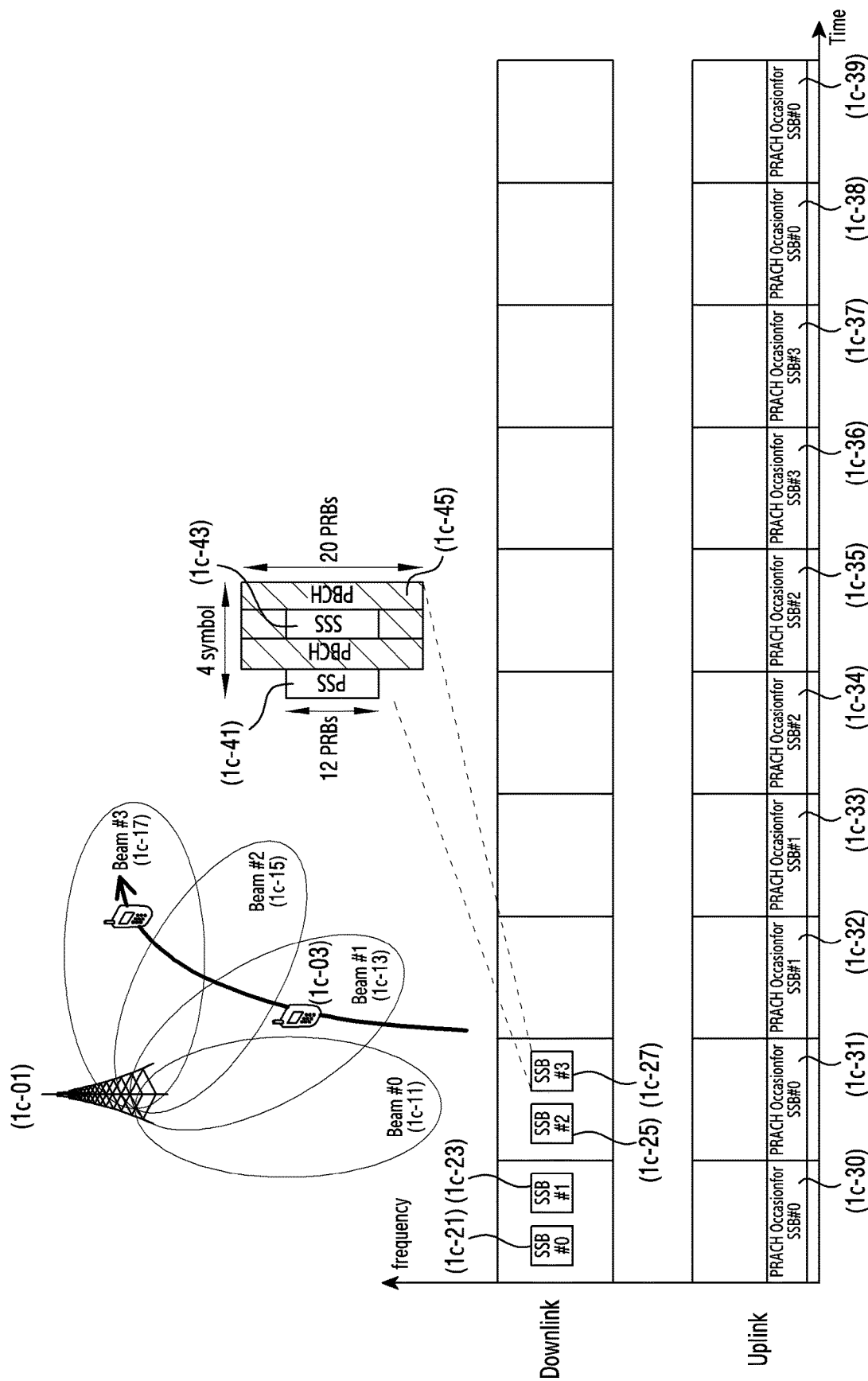
FIG. 1C illustrates an example of a downlink and uplink channel frame structure during beam-based communication performed in an NR system according to an embodiment of the disclosure.

FIG. 1C illustrates an example of a downlink and uplink channel frame structure during beam-based communication performed in an NR system according to an embodiment of the disclosure.

Referring to FIG. 1C, a base station 1c-01 transmits a signal in the form of a beam 1c-11, 1c-13, 1c-15, 1c-17 in order to transmit wider coverage or a stronger signal. Accordingly, a terminal 1c-03 within the cell should transmit and receive data by using a specific beam (beam #1 1c-13 in the example) transmitted by the base station.

Depending on whether the terminal is connected to the base station, the status of the terminal is divided into dormant mode (RRC_IDLE) and connected mode (RRC_CONNECTED). Accordingly, the base station does not know the location of the terminal in dormant mode.

When the terminal in dormant mode wants to transition to connected mode, the terminal receives a synchronization signal block (SSB) 1c-21, 1c-23, 1c-25, 1c-27 transmitted by the base station. The SSB may be transmitted periodically according to the period configured by the base station, and may include a primary synchronization signal (PSS) 1c-41, a secondary synchronization signal (SSS) 1c-43, and a physical broadcast channel (PBCH) 1c-45.

FIG. 1C assumes a scenario in which SSB is transmitted for each beam. For example, it is assumed that SSB #0 1c-21 is transmitted using beam #0 1c-11, SSB #1 1c-23 is transmitted using beam #1 1c-13, SSB #2 1c-25 is transmitted using beam #2 1c-15, and SSB #3 1c-27 is transmitted using beam #3 1c-17. In the example drawing, it is assumed that the terminal in dormant mode is located in beam #1, but even when the terminal in connected mode performs random access, the terminal may select SSB received at the time of performing random access.

Accordingly, the terminal 1c-03 receives SSB #1 transmitted via beam #1. Upon receiving SSB #1, the terminal 1c-03 acquires the physical cell identifier (PCI) of the base station through PSS and SSS, and by receiving the PBCH, and may identify the identifier (i.e. #1) of the currently received SSB, and identify not only which position within the 10 ms frame the current SSB is received, but also which SFN the position is within system frame number (SNF) with a period of 10.24 seconds. In addition, a master information block (MIB) is included in the PBCH, and the MIB informs the location where system information block type 1 (SIB1), which broadcasts more detailed cell configuration information, may be received. Upon receiving SIB1, the terminal may know the total number of SSBs transmitted by this base station and may identify the location (in FIG. 1C, assuming a scenario in which physical random access channel (PRACH) occasion is allocated every 1 ms: from 1c-30 to 1c-39) of the physical random access channel (PRACH) occasion that may perform random access to transition to the connected mode state (more precisely, may transmit the preamble, which is a physical signal specially designed for uplink synchronization). In addition, based on this information, it is possible to know which PRACH occasion among PRACH occasions is mapped to which SSB index. For example, FIG. 1C assumes a scenario in which PRACH occasions are allocated every 1 ms, and ½ SSBs are allocated per PRACH occasion (i.e., 2 PRACH occasions per SSB). Accordingly, two PRACH occasions may be assigned to each SSB from the start of the PRACH occasion, which starts according to an SFN value. That is, 1c-30 and 1c-31 may be allocated for SSB #0, and 1c-32 and 1c-33 may be allocated for SSB #1. After configuration for all SSBs, PRACH occasion is allocated again for the first SSB 1c-38, 1c-39.

Accordingly, the terminal 1c-03 identifies the location of PRACH occasion 1c-32, 1c-33 for SSB #1, and accordingly, the random access preamble is transmitted by the fastest PRACH occasion (for example, 1c-32) at the current time, among PRACH occasion 1c-32, 1c-33 corresponding to SSB #1. Since the preamble is received from the PRACH occasion 1c-32, the base station 1c-01 may know that the corresponding terminal has selected SSB #1 and transmitted the preamble, and accordingly, data may be transmitted and received via the corresponding beam when subsequent random access is performed.

Even when a connected terminal moves from the current (source) base station to the destination (target) base station for reasons such as handover, the terminal performs random access to the target base station, and selects an SSB to perform an operation of transmitting random access preamble as described above. In addition, in the case of handover, a handover command is sent to the terminal to move from the source base station to the target base station. At this time, the message containing the handover command may include a random access preamble identifier dedicated to the corresponding terminal for each SSB of the target base station, to be used when performing random access at the target base station. At this time, the base station may not allocate a dedicated random access preamble identifier to all beams (depending on the current location of the terminal, etc.), and accordingly, a dedicated random access preamble may not be assigned to some SSBs (for example, dedicated random access preamble is assigned only to beam #2 and #3). When a dedicated random access preamble is not assigned to the SSB selected by the terminal for preamble transmission, the terminal may perform random access by randomly selecting a contention-based random access preamble. For example, in the drawing, the terminal may be initially located in beam #1 where a dedicated random access preamble is not assigned, to perform random access, but the random access may be failed, and then the terminal may be located in beam #3 where the dedicated random access preamble is assigned to perform dedicated preamble transmission when transmitting the random access preamble again. That is, even within one random access procedure, when preamble retransmission occurs, a contention-based random access procedure or a non-contention-based random access procedure may be performed depending on whether a dedicated random access preamble is assigned to the selected SSB at each preamble transmission.

Figure 1D:
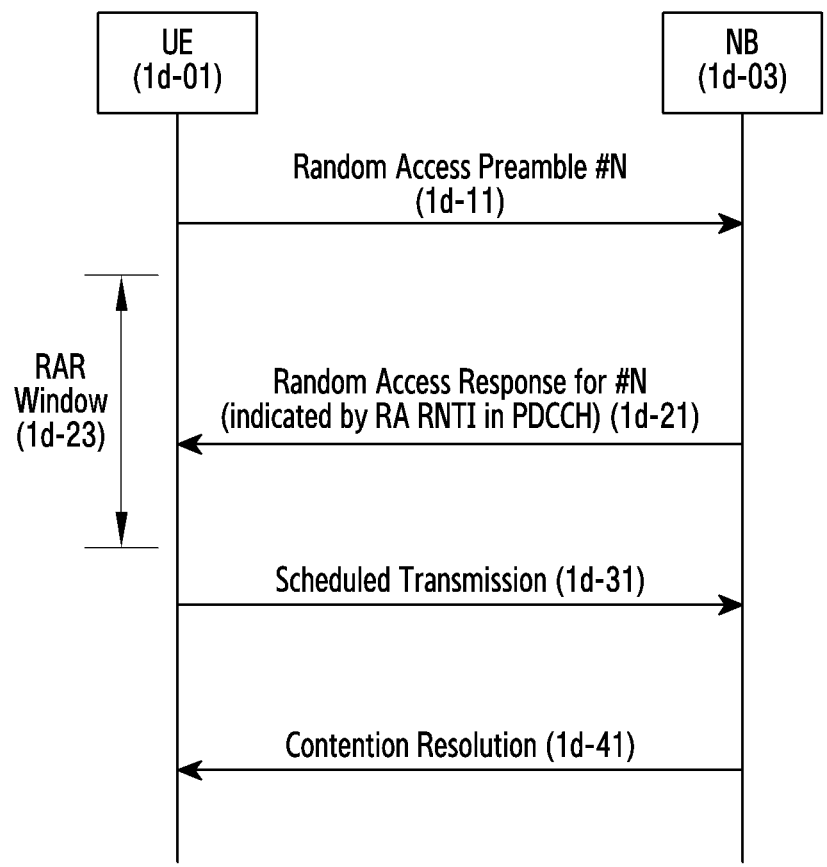
FIG. 1D illustrates a procedure in which a terminal performs contention-based four-step random access to a base station according to an embodiment of the disclosure.

FIG. 1D illustrates a procedure in which a terminal performs contention-based four-step random access to a base station according to an embodiment of the disclosure.

FIG. 1D illustrates a four-step contention-based random access procedure performed in various cases where a terminal needs initial connection, reconnection, handover, and random access to a base station.

Referring to FIG. 1D, in order to connect to a base station 1d-03, a terminal 1d-01 selects a PRACH according to the above-described FIG. 1C and transmits a random access preamble to the corresponding PRACH, in operation 1d-11. There may also be cases where more than one terminal transmit a random access preamble at the same time by using PRACH resources. The PRACH resources may span one subframe, or only some symbols within one subframe may be used. Information about the PRACH resources may be included in system information broadcast by the base station, and accordingly, the terminal may know through which time frequency resource the preamble should be transmitted. In addition, the random access preamble may have a plurality of preamble identifiers (index) according to the standard in a specific sequence, so as to be received by the base station even if transmitted before being completely synchronized with the base station. When there are multiple preamble identifiers, the preamble transmitted by the terminal may be randomly selected by the terminal, or may be a specific preamble designated by the base station.

When the base station receives the preamble, a random access response (hereinafter referred to as RAR) message corresponding thereto is transmitted to the terminal, in operation 1d-21. The RAR message may include at least one of preamble identifier information used in operation 1d-11, uplink transmission timing correction information, uplink resource allocation information to be used in the next operation (i.e., operation 1d-31), and temporary terminal identifier information. For example, when a plurality of terminals attempt random access by transmitting different preambles in operation 1d-11, the preamble identifier information is sent to inform for which preamble the RA message is a response message. The uplink resource allocation information is detailed information on the resources to be used by the terminal in operation 1d-31, and may include at least one of a physical location and size of the resource, a modulation and coding scheme (MCS) used during transmission, and power adjustment information during transmission. When the terminal having transmitted the preamble makes initial connection, the temporary terminal identifier information is a value transmitted to the terminal for use in communication with the base station because the terminal does not have an identifier assigned by the base station for communication with the base station.

An RAR message should be transmitted within a predetermined period starting after a predetermined time after the preamble is transmitted, and this period is called an "RAR window" 1d-23 The RAR window 1d-23 starts after a predetermined time after a first preamble is transmitted. The predetermined time may have a subframe unit (1 ms) or a value smaller than the subframe unit. In addition, the length of the RAR window may be a predetermined value configured by the base station for each PRACH resource or for one or more PRACH resource sets within the system information message broadcast by the base station.

When an RAR message is transmitted, the base station schedules the RAR message through the PDCCH, and the scheduling information is scrambled using a random access-radio network temporary identifier (RA-RNTI). The RA-RNTI is mapped to the PRACH resource used to transmit the message of operation 1d-11, and the terminal having transmitted the preamble to a specific PRACH resource attempts to receive the PDCCH, based on the RA-RNTI to determine whether there is a corresponding RAR message. That is, when the RAR message is a response to the preamble transmitted by the terminal in operation 1d-11 as shown in FIG. 1D, the RA-RNTI used in the RAR message scheduling information includes information about the corresponding transmission of operation 1d-11. To this end, the RA-RNTI may be determined based on the time resource or frequency resource information through which the preamble is transmitted, and may be calculated, for example, using Equation 1 below.

$$\text{RA-RNTI} = 1 + s\_id + 14 \times t\_id + 14 \times 80 \times f\_id + 14 \times 80 \times 8 \times ul\_carrier\_id \qquad \text{Equation 1}$$

At this time, s_id indicates an index corresponding to the first OFDM symbol where preamble transmission started in operation 1d-11, and has a value of $0 \leq s\_id < 14$ (i.e., maximum number of OFDM within one slot). In addition, t_id indicates an index corresponding to the first slot where the preamble transmission started in operation 1d-11 and has a value of $0 \leq t\_id < 80$ (i.e., the maximum number of slots within one system frame (10 ms)). In addition, f_id indicates on which PRACH resource in frequency the preamble transmitted in operation 1d-11 is transmitted, and has a value $0 \leq f\_id < 8$ (i.e., the maximum number of PRACHs in frequency within the same time). In addition, when two carriers are used in the uplink for one cell, ul_carrier_id is a factor for identifying whether the preamble has been transmitted in the normal uplink (NUL) (in this case, 0) or whether the preamble has been transmitted in the supplementary uplink (SUL) (in this case, 1).

The terminal having received the RAR message transmits other messages to the resources allocated to the RAR message according to the various purposes described above (e.g., operation 1d-31). This message is also referred to as Msg3, which is a message thirdly transmitted in FIG. 1D (that is, the preamble in operation 1d-11 or 1d-13 is called Msg1, the RAR in operation 1d-21 is called Msg2.) As an example of Msg3 transmitted by the terminal, in the case of initial connection, an RRCConnectionRequest message, which is an RRC layer message, is sent, in case of reconnection, an RRCConnectionReestablishmentRequest message is sent, and during handover, an RRCConnectionReconfigurationComplete message is sent. Alternatively, a buffer status report (BSR) message may be transmitted for a resource request.

Afterwards, the terminal receives a contention resolution message from the base station in case of initial transmission (i.e., Msg3 does not contain base station identifier information previously assigned to the terminal, etc.), in operation 1d-41. The contention resolution message may contain the content transmitted by the terminal in Msg3 and may inform which terminal the response is to, even if there are multiple terminals that selected the same preamble in operation 1d-11 or 1d-13.

The contention resolution timer (ra-ContentionResolutionTimer) is started or restarted at the end of the uplink allocated for Msg3 transmission through RAR or PDCCH (e.g., the first OFDM symbol after the uplink). Accordingly, the terminal attempts to receive Msg4 from the base station until the timer expires. When Msg4 is not received until the timer expires, the terminal determines that contention resolution has failed, and retransmits the preamble.

An operation in an unlicensed band is considered in the aforementioned 5G system. The unlicensed band may refer to a frequency band that anyone may freely use the corresponding frequency without a separate license within the regulatory range. For example, the unlicensed band may include a 2.4 GHz or 5 GHz band, and wireless LAN, Bluetooth, and the like performs communication by using that frequency.

When communication is to be performed in the unlicensed band, data should be transmitted and received in accordance with regulations set by each country. More specifically, according to regulations, before a communication device performs transmission in the unlicensed band, the communication device should "listen" to determine whether the unlicensed band is occupied by another communication device, and the communication device should perform "transmission" when determining that the unlicensed band is empty. The method of listening and performing transmission when the unlicensed band is empty is called Listen-Before-Talk (LBT). There are regulations for performing the above LBT for each country and unlicensed band, and communication devices should perform LBT when communicating in the unlicensed band in accordance with the regulation.

The LBT has two main types including LBT type 1 and LBT type 2.

Figure 1E:
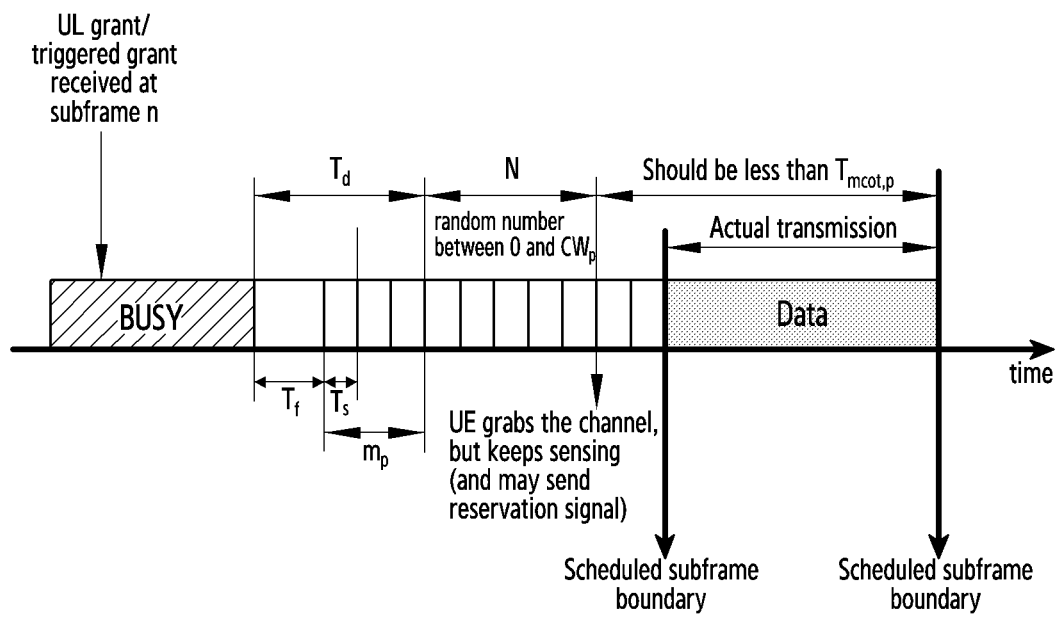
FIG. 1E illustrates LBT Type 1 according to an embodiment of the disclosure.

FIG. 1E illustrates LBT Type 1 according to an embodiment of the disclosure.

Referring to FIG. 1E, LBT type 1 is a method in which a time is randomly set such that a device listens to whether other nearby devices perform transmission before performing transmission, and performs transmission when the channel is empty for the random time. At this time, the device first listens for a fixed time (Td), and when the channel is empty, determines whether the channel is empty again for a random time (N).

At this time, the values of Td and N may be determined differentially depending on the priority and importance of traffic, etc. In the embodiment, a total of four different classes are used as examples. Here, the class is called a channel access priority class (CAPC).

In addition, according to CAPC, Td has a time length of 16+mp*9 microseconds (μs) and N has random (0, CWp)*9 (μs), and a CW value starts from CWmin,p and then increases each time transmission fails, and has a maximum value of Cwmax,p. For example, when LBT is performed using a method with a CAPC of 3, Td has a length of 16+3*9=43 μs, and N chooses a random value between 0 and 15 for the initial transmission. For example, when 7 is selected as the random value, N becomes 7*9=63 μs, and the communication device transmits data for 106 μs when the channel is empty.

TABLE 1

| Channel Access Priority Class (p) | $m_p$ | $CW_{min,p}$ | $CW_{max,p}$ | $T_{mcot,p}$ | allowed $CW_p$ size |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 265, 511, 1023} |

In the example above (when 7 is selected for N), in case that a terminal determines that the channel is occupied by another device in the middle of determining whether the channel is empty (for example, when 3 of the 7 above have passed and 4 remain) (that is, when the received signal strength (RSSI) is equal to or greater than a predetermined threshold), the terminal waits until the channel occupancy ends, then waits again for Td, determines whether the channel is empty for the remaining 4 times, and performs transmission. As noted from the table above, the LBT method with a low CAPC may be used when high priority traffic is transmitted.

Figure 1F:
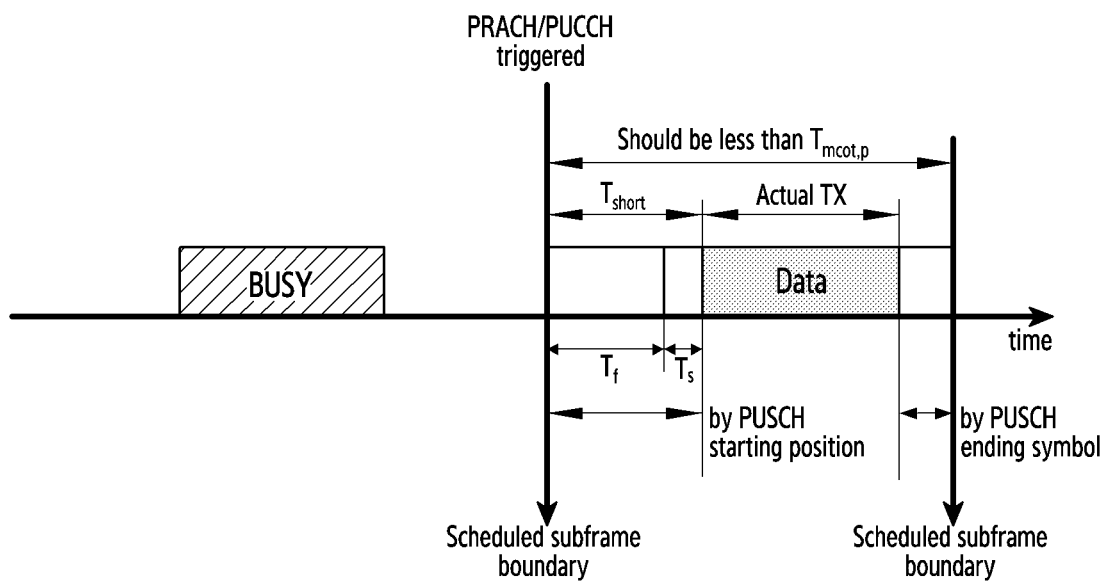
FIG. 1F illustrates LBT Type 2 according to an embodiment of the disclosure.

FIG. 1F illustrates LBT Type 2 according to an embodiment of the disclosure.

Referring to FIG. 1F, LBT Type 2 is a method in which a time for listening to whether other nearby devices perform transmission before transmission is fixed, and accordingly transmission is immediately performed when the channel is empty for the fixed time. That is, in FIG. 1F, when a communication device needs to perform transmission, the communication device listens (senses) the channel for a fixed time of Tshort (=Tf+Ts) and immediately transmits data when determining that the channel is empty. This is an LBT method which may be used when a very high priority signal is transmitted. Accordingly, the random access preamble (e.g., of operation 1d-11 in FIG. 1D) and the PUCCH described above in FIG. 1D are signals of high importance and thus may be transmitted using this LBT method.

Figure 1G:
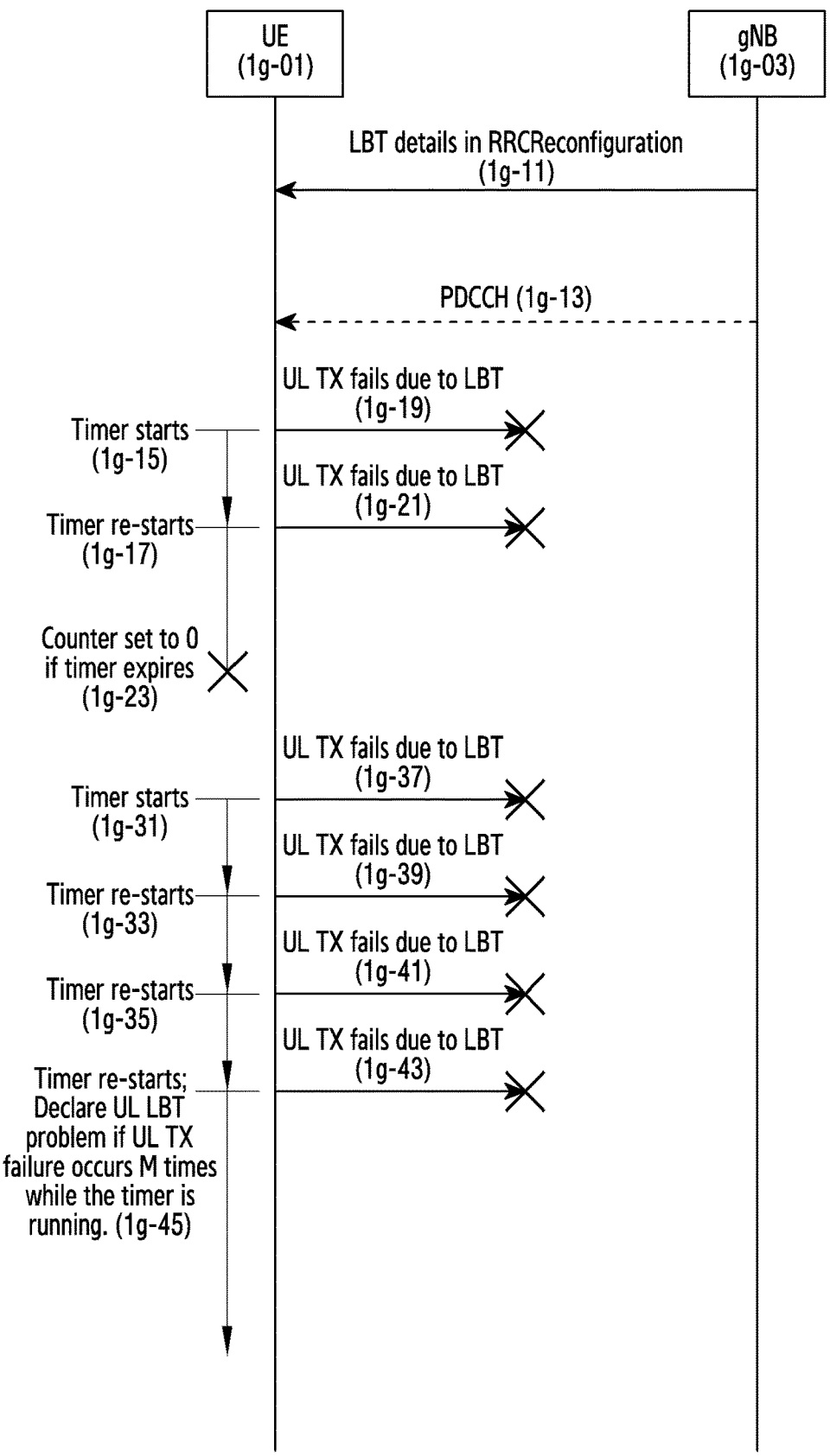
FIG. 1G illustrates a procedure between a terminal and a base station when the terminal detects an uplink LBT failure problem according to an embodiment of the disclosure.

FIG. 1G illustrates a procedure between a terminal and a base station when the terminal detects an uplink LBT failure problem according to an embodiment of the disclosure.

Referring to FIG. 1G, it is assumed that a terminal 1g-01 may access a base station 1g-03 operating in the unlicensed band and be in the RRC connected state (RRC_CONNECTED). In the RRC connection state, the terminal may transmit and receive data to and from the base station. In addition, the terminal may receive parameters related to detection of uplink LBT problems to be described later, from the base station through an RRCReconfiguration message or system information (SIB) message, in operation 1g-11.

Afterwards, the terminal may receive scheduling for uplink resources from the base station through PDCCH, in operation 1g-13, or perform uplink transmission for performing random access, transmitting PUCCH, transmitting data to configured uplink resources (configured uplink grant), and the like.

As described above, the terminal should perform LBT operation when transmitting data in an unlicensed band, the type of LBT to be performed is configured for each uplink resource allocation in the PDCCH or for each logical channel in the RRC message, and the terminal may perform LBT according to the configuration of the highest (or lowest) priority among the logical channels to which the actually transmitted data belongs.

Accordingly, when the terminal is not able to perform transmission due to LBT failure when performing uplink transmission, the terminal operates a timer (lbt-FailureDetectionTimer), in operation 1g-15, for LBT failure detection. At this time, the length of the timer may be configured through the RRCReconfiguration message or SIB message. In addition, whenever LBT fails (e.g., in operation 1g-19, 1g-21), a predetermined counter is incremented and the timer is restarted, in operation 1g-17. This is to allow the terminal to recognize seriousness of the UL LBT problem and perform an additional operation when the counter reaches the value (lbt-FailureInstanceMaxCount) configured by the base station through the RRCReconfiguration or SIB message while the timer is running.

Afterwards, when the number of failures (e.g., 4 times) configured by the base station does not occur until the timer expires, the terminal determines that the uplink LBT problem no longer occurs and configures the counter to 0, in operation 1g-23.

In addition, as another example, in case that the terminal is not able to perform transmission due to LBT failure when performing uplink transmission, in operation 1g-37, 1g-39, 1g-41, 1g-43, the terminal operates a timer, in operation 1g-31, 1g-33, 1g-35. Afterwards, the terminal attempts additional uplink transmission, and the transmission continued to fail due to UL LBT issues. When the number of failures occurs as many times as configured by the base station (for example, 4 times), the terminal recognizes an uplink LBT problem sufficient to cause problems with uplink transmission and performs additional procedures to repair the problem, in operation 1g-45. The above additional procedures include a procedure for transmitting LBT failure MAC CE, and a procedure in which switching to another bandwidth (bandwidth part (BWP)) within another SpCell where LBT failure did not occur is made in case of SpCell, and when an LBT failure occurs in all BWPs, the MAC layer of the terminal informs the upper layer (RRC) of the failure, whereby the upper layer of the terminal declares a radio link failure (RLF). When a radio connection failure is declared, the terminal selects the cell with the strongest signal among the surrounding cells and attempts to re-establish the connection (connection re-establishment).

Figure 1H:
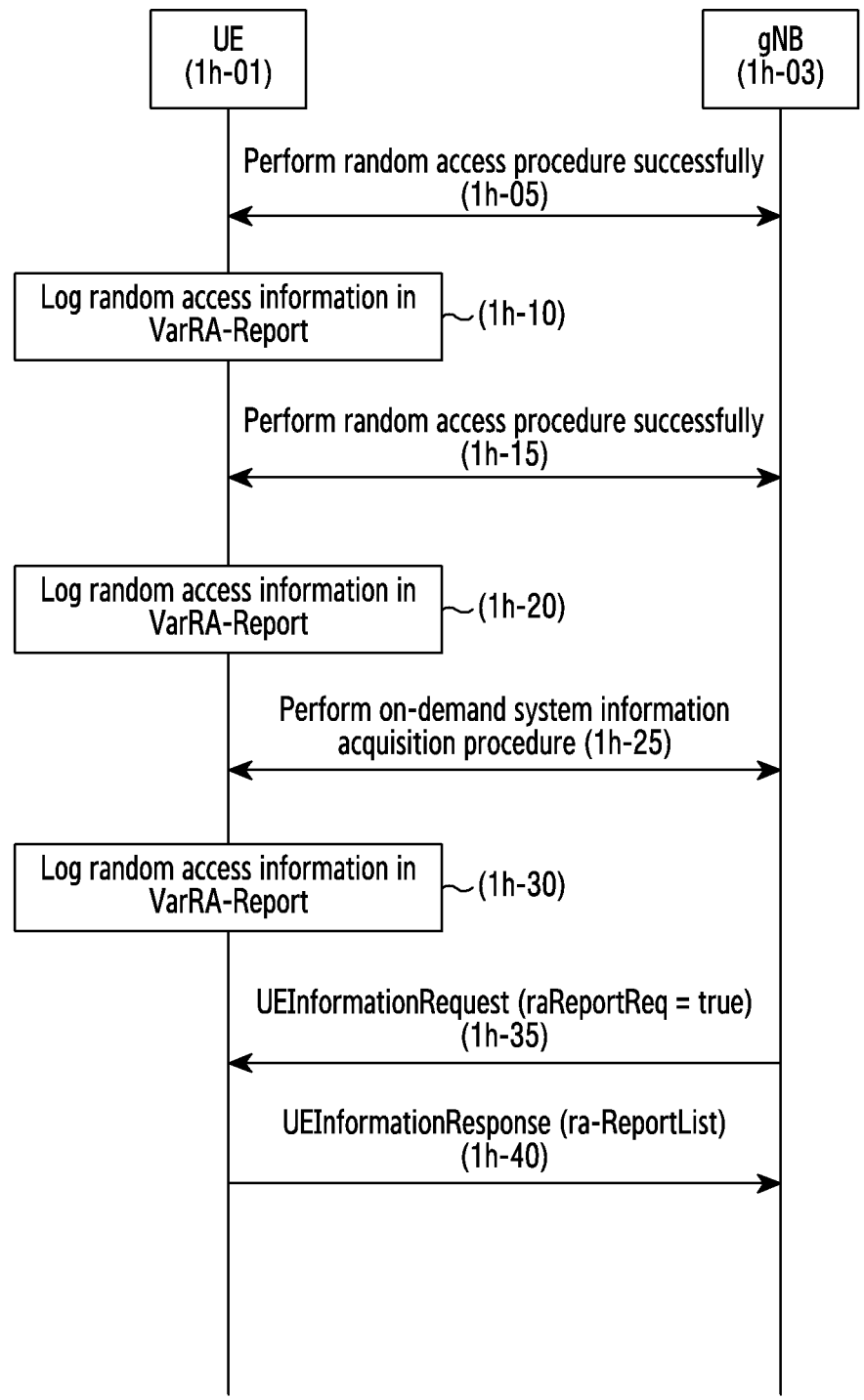
FIG. 1H illustrates a procedure for reporting random access information stored in a VarRA-Report variable, by a terminal to a base station according to an embodiment of the disclosure.

FIG. 1H illustrates a procedure for reporting random access information stored in the VarRA-Report variable by a terminal to a base station according to an embodiment of the disclosure.

Referring to FIG. 1H, a terminal 1h-01 may perform random access (for the reason of the above-described embodiment) or an on-demand system information (SI) acquisition procedure with a base station 1h-03. When the terminal 1h-01 successfully performs random access, information about the successful random access procedure may be stored in the VarRA-Report variable. Alternatively, when the terminal 1h-01 successfully performs or fails the on-demand SI acquisition procedure in RRC idle mode (RRC_IDLE) or RRC inactive mode (RRC_INACTIVE), information about success or failure may be stored in the VarRA-Report variable. For reference, the information storable in the VarRA-Report variable by the terminal 1h-01 includes RA-ReportList and PLMN-IdentityList. The RA-ReportList may include one or multiple RA-Reports and the PLMN-IdentityList may include one or multiple PLMN-Identities.

In operation 1h-05, the terminal 1h-01 may successfully perform random access with the base station 1h-03.

In operation 1h-10, the terminal 1h-01 may log the random access information, performed in operation 1h-05, in the VarRA-Report variable. Specifically, the terminal 1h-01 may log random access information in the VarRA-Report variable by performing the procedure according to Table 2 below.

TABLE 2

1> if the RPLMN or the PLMN selected by upper layers (see TS24.501 [23]) from the PLMN(s) included in the plmn-IdentityList in SIB1 is not included in plmn-IdentityList stored in a non-empty VarRA-Report:
  2> clear the information included in VarRA-Report;
1> if the number of RA-Report entries stored in the ra-ReportList in VarRA-Report is less than maxRAReport:
  2> if the number of PLMN entries in plmn-IdentityList stored in VarRA-Report is less than maxPLMN; or
  2> if the number of PLMN entries in plmn-IdentityList stored in VarRA-Report is equal to maxPLMN and the list of EPLMNs is subset of or equal to the plmn-IdentityList stored in VarRA-Report:
    3> append the following contents associated to the successfully completed random-access procedure or the failed or successfully completed on-demand system information acquisition procedure as a new entry in the VarRA-Report:
      4> if the list of EPLMNs has been stored by the UE:
        5> set the plmn-IdentityList to include the list of EPLMNs stored by the UE (i.e. includes the RPLMN) without exceeding the limit of maxPLMN;
      4> else:
        5> set the plmn-Identity, in plmn-IdentityList, to the PLMN selected by upper layers (see TS 24.501 [23]) from the PLMN(s) included in the plmn-IdentityInfoList in SIB1;
      4> set the cellId to the global cell identity and the tracking area code, if available, otherwise to the physical cell identity and carrier frequency of the cell in which the corresponding random-access preamble was transmitted;
      4> if the corresponding random-access procedure was performed on an SCell of MCG:
        5> set the spCellId to the global cell identity of the PCell;
      4> if the corresponding random-access procedure was performed on an SCell of SCG:
        5> set the spCellId to the global cell identity of the PSCell;
      4> set the raPurpose to include the purpose of triggering the random-access procedure;
      4> set the ra-InformationCommon as specified in clause 5.7.10.5.
5.7.10.5     RA information determination for RA report and RLF report
The UE shall set the content in ra-InformationCommon as follows:
  1> set the absoluteFrequencyPointA to indicate the absolute frequency of the reference resource block associated to the random-access resources used in the random-access procedure;

TABLE 2-continued

1> set the locationAndBandwidth and subcarrierSpacing associated to the UL BWP of the random-access resources used in the random-access procedure;
1> if contention based random-access resources are used in the random-access procedure:
    2> set the msgA_RO-FrequencyStart and msgA-RO-FDM and msgA-SubcarrierSpacing associated to the 2 step random- access resources if used in the random-access procedure;
    2> if msgA-SubcarrierSpacing associated to the 2 step random-access resources used in the random-access procedure is available:
        3> set the msgA-SubcarrierSpacing associated to the 2 step random-access resources used in the random-access procedure;
    2> else if only 2 step random-access resources are available in the UL BWP used in the random-access procedure:
        3> set the msgA-SCS-From-prach-ConfigurationIndex to the subcarrier spacing as derived from the msgA-PRACH-ConfigurationIndex used in the 2-step random-access procedure;
    2> else:
        3> set the msg1-SubcarrierSpacing associated to the 4 step random-access resources used in the random-access procedure;
    2> set the msg1-FrequencyStart associated to the 4 step random-access resources if used in the random-access procedure, and if its value is different from the value of msgA-RO-FrequencyStart if it is included in the ra-InformationCommon;
    2> set the msg1-FDM associated to the 4 step random-access resources if used in the random-access procedure, and if its value is different from the value of msgA-RO-FDMCFRA if it is included in the ra-InformationCommon;
    2> if msg1-SubcarrierSpacing associated to the 4 step random-access resources used in the random-access procedure is available, and if its value is different from the value of msgA-SubcarrierSpacing if it is included in the ra-InformationCommon:
        3> set the msg1-SubcarrierSpacing associated to the 4 step random-access resources used in the random-access procedure;
    2> else:
        3> set the msg1-SCS-From-prach-ConfigurationIndex to the subcarrier spacing as derived from the prach-ConfigurationIndex used in the 4-step random-access procedure, and if its value is different from the value of msgA-SCS-From-prach-ConfigurationIndex if it is included in the ra-InformationCommon;
1> if contention free random-access resources are used in the random-access procedure:
    2> set the msg1-FrequencyStartCFRA and msg1-FDMCFRA associated to the 4 step random-access resources if used in the random-access procedure;
    2> if msg1-SubcarrierSpacing associated to the 4 step random-access resources used in the random-access procedure is available:
        3> set the msg1-SubcarrierSpacingCFRA associated to the 4 step random-access resources used in the random-access procedure;
    2> else:
        3> set the msg1-SCS-From-prach-ConfigurationIndexCFRA to the subcarrier spacing as derived from the prach-ConfigurationIndex used in the 4 step random-access procedure;
    2> set the msgA-RO-FrequencyStartCFRA and msgA-RO-FDMCFRA associated to the 2 step contention free random access resources if used in the random-access procedure;
    2> set the msgA-MCS, the nrofPRBs-PerMsgA-PO, the msgA-PUSCH-TimeDomainAllocation, the frequencyStartMsgA-PUSCH, the nrofMsgA-PO-FDM associated to the 2 step random-access resources if used in the random-access procedure;
    2> if msgA-SubcarrierSpacing associated to the 2 step random-access resources used in the random-access procedure is available:
        3> set the msgA-SubcarrierSpacing associated to the 2 step random-access resources used in the random-access procedure;
    2> else if only 2 step random-access resources are available in the UL BWP used in the random-access procedure:
        3> set the msgA-SCS-From-prach-ConfigurationIndex to the subcarrier spacing as derived from the msgA-PRACH-ConfigurationIndex used in the 2-step random-access procedure;
    2> else:
        3> set the msg1-SubcarrierSpacing associated to the 4 step random-access resources used in the random-access procedure;
1> if the random access procedure is initialized with RA_TYPE set to 2-stepRA as described in TS 38.321 [3]:
    2> set the dlPathlossRSRP to the meaesured RSRP of the DL pathloss reference obtained at the time of RA_Type selection stage of the initialization of the RA procedure as captured in TS 38.321 [3];
    2> if the configuration for the random access msgA-TransMax was configured in RACH-ConfigDedicated for this random access procedure, and ra-Purpose is set to reconfigurationWithSync:
        3> set msgA-TransMax to the value of msgA-TransMax in RACH-ConfigDedicated;
    2> else if msgA-TransMax was configured in RACH-ConfigCommonTwoStepRA:
        3> set msgA-TransMax to the value of msgA-TransMax in RACH-ConfigCommonTwoStepRA;
    2> set the msgA-PUSCH-PayloadSize to the size of the overall payload available in the UE buffer at the time of initiating the 2 step RA procedure;
1> if the purpose of the random access procedure is to request on-demand system information (i.e., if the raPurpose is set to requestForOtherSI or msg3RequestForOtherSI):
    2> set the intendedSIBs to indicate the SIB(s) the UE wanted to receive as a result of the SI request;
    2> set the ssbsForSI-Acquisition to indicate the SSB(s) used to receive the SI message;
    2> if the on-demand system information acquisition was successful:
        3> set the onDemandSISuccess to true;

TABLE 2-continued

```
1>  set the parameters associated to individual random-access attempt in the chronological order of
    attempts in the perRAInfoList as follows:
    2>  if the random-access resource used is associated to a SS/PBCH block, set the associated
        random-access parameters for the successive random-access attempts associated to the same
        SS/PBCH block for one or more random-access attempts as follows:
        3>  set the ssb-Index to include the SS/PBCH block index associated to the used random-
            access resource;
        3>  set the numberOfPreamblesSentOnSSB to indicate the number of successive random-
            access attempts associated to the SS/PBCH block;
        3>  for each random-access attempt performed on the random-access resource, include the
            following parameters in the chronological order of the random-access attempt:
            4>  if the random-access attempt is performed on the contention based random-access
                resource and if raPurpose is not equal to 'requestForOtherSI', include
                contentionDetected as follows:
                5>  if contention resolution was not successful as specified in TS 38.321 [6] for the
                    transmitted preamble:
                    6>  set the contentionDetected to true;
                5>  else:
                    6>  set the contentionDetected to false;
            4>  if the random access attempt is a 2-step random access attempt:
                5>  if fallback from 2-step random access to 4-step random access occurred during
                    the random access attempt:
                    6>  set fallbackToFourStepRA to true;
            4>  if the random-access attempt is performed on the contention based random-access
                resource; or
            4>  if the random-access attempt is performed on the contention free random-access
                resource and if the random-access procedure was initiated due to the PDCCH
                ordering:
                5>  if the random access attempt is a 4-step random access attempt and the SS/PBCH
                    block RSRP of the SS/PBCH block corresponding to the random-access resource
                    used in the random-access attempt is above rsrp-ThresholdSSB; or
                5>  if the random access attempt is a 2-step random access attempt and the SS/PBCH
                    block RSRP of the SS/PBCH block corresponding to the random-access resource
                    used in the random-access attempt is above msgA-RSRP-ThresholdSSB:
                    6>  set the dlRSRPAboveThreshold to true;
                5>  else:
                    6>  set the dlRSRPAboveThreshold to false;
    2>  else if the random-access resource used is associated to a CSI-RS, set the associated
        random-access parameters for the successive random-access attempts associated to the same
        CSI-RS for one or more random-access attempts as follows:
        3>  set the csi-RS-Index to include the CSI-RS index associated to the used random-access
            resource;
        3>  set the numberOfPreamblesSentOnCSI-RS to indicate the number of successive random-
            access attempts associated to the CSI-RS.
```

In operation 1h-15, the terminal 1h-01 may successfully perform random access with the base station 1h-03.

In operation 1h-20, the terminal 1h-01 may log the random access information, performed in operation 1h-15, in the VarRA-Report variable. This may follow what has been described above.

In operation 1h-25, the terminal 1h-01 in RRC idle mode (RRC_IDLE) or RRC inactive mode (RRC_INACTIVE) may perform an on-demand SI information acquisition procedure with the base station. At this time, the terminal 1h-01 may succeed or fail the on-demand SI information acquisition procedure.

In operation 1h-30, the terminal 1h-01 may log successful or failed random access information in the VarRA-Report variable, regardless of whether the on-demand SI information acquisition procedure succeeds or fails in operation 1h-25. This may follow what has been described above.

In operation 1h-35, the base station 1h-03 may transmit a UEInformationRequest message to the terminal 1h-01. In the above message, raReportReq may be configured as true.

In operation 1h-40, the terminal 1h-01 may transmit a UEInformationResponse message to the base station 1h-03. When there is random access-related information in VarRA-Report, and RPLMN (registered PLMN) is included in the plmn-IdentityList stored in VarRA-Report, the terminal 1h-01 may store the value of ra-ReportList in VarRA-Report present in a UEInformationResponse message and transmit the value to the base station 1h-03. In addition, when the terminal 1h-01 confirms that the UEInformationResponse message has been successfully delivered from the lower layer device, ra-ReportList in VarRA-Report may be released. For reference, RA-ReportList may have an ASN.1 structure as shown below, and the description of the fields in each RA-Report may be as shown in Table 3 below.

TABLE 3

```
RA-ReportList-r16 ::= SEQUENCE (SIZE (1..maxRAReport-r16)) OF RA-Report-r16
RA-Report-r16 ::=           SEQUENCE {
    cellId-r16                  CHOICE {
        cellGlobalId-r16            CGI-Info-Logging-r16,
        pci-arfcn-r16               PCI-ARFCN-NR-r16
    },
```

TABLE 3-continued

```
    ra-InformationCommon-r16          RA-InformationCommon-r16
OPTIONAL,
    raPurpose-r16                     ENUMERATED {accessRelated,
beamFailureRecovery, reconfigurationWithSync, ulUnSynchronized,
                                                        schedulingRequestFailure,
noPUCCHResourceAvailable, requestForOtherSI,
                                                        msg3RequestForOtherSI-r17, spare8,
spare7, spare6, spare5, spare4, spare3,
                                                        spare2, spare1},
    ...,
    [[
    spCellID-r17                      CGI-Info-Logging-r16
OPTIONAL
    ]]
}
RA-InformationCommon-r16 ::=    SEQUENCE {
    absoluteFrequencyPointA-r16       ARFCN-ValueNR,
    locationAndBandwidth-r16          INTEGER (0..37949),
    subcarrierSpacing-r16             SubcarrierSpacing,
    msg1-FrequencyStart-r16           INTEGER (0..maxNrofPhysicalResourceBlocks-1)
OPTIONAL,
    msg1-FrequencyStartCFRA-r16       INTEGER (0..maxNrofPhysicalResourceBlocks-1)
OPTIONAL,
    msg1-SubcarrierSpacing-r16        SubcarrierSpacing
OPTIONAL,
    msg1-SubcarrierSpacingCFRA-r16    SubcarrierSpacing
OPTIONAL,
    msg1-FDM-r16                      ENUMERATED {one, two, four, eight}
OPTIONAL,
    msg1-FDMCFRA-r16                  ENUMERATED {one, two, four, eight}
OPTIONAL,
    perRAInfoList-r16                 PerRAInfoList-r16,
    ...,
    [[
    perRAInfoList-v1660               PerRAInfoList-v1660
OPTIONAL
    ]],
    [[
    msg1-SCS-From-prach-ConfigurationIndex-r16 ENUMERATED {kHz1dot25, kHz5, spare2,
spare1}          OPTIONAL
    ]],
    [[
    msg1-SCS-From-prach-ConfigurationIndexCFRA-r16         ENUMERATED {kHz1dot25, kHz5,
spare2, spare1} OPTIONAL
    ]],
    [[
    msgA-RO-FrequencyStart-r17        INTEGER (0..maxNrofPhysicalResourceBlocks-1)
OPTIONAL,
    msgA-RO-FrequencyStartCFRA-r17    INTEGER (0..maxNrofPhysicalResourceBlocks-1)
OPTIONAL,
    msgA-SubcarrierSpacing-r17        SubcarrierSpacing
OPTIONAL,
    msgA-RO-FDM-r17                   ENUMERATED {one, two, four, eight}
OPTIONAL,
    msgA-RO-FDMCFRA-r17               ENUMERATED {one, two, four, eight}
OPTIONAL,
    msgA-SCS-From-prach-ConfigurationIndex-r17 ENUMERATED {kHz1dot25, kHz5, spare2,
spare1}          OPTIONAL,
    msgA-TransMax-r17                 ENUMERATED {n1, n2, n4, n6, n8, n10, n20,
n50, n100, n200} OPTIONAL,
    msgA-MCS-r17                      INTEGER (0..15)
OPTIONAL,
    nrofPRBs-PerMsgA-PO-r17           INTEGER (1..32)
OPTIONAL,
    msgA-PUSCH-TimeDomainAllocation-r17  INTEGER (1..maxNrofUL-Allocations)
OPTIONAL,
    frequencyStartMsgA-PUSCH-r17      INTEGER (0..maxNrofPhysicalResourceBlocks-1)
OPTIONAL,
    nrofMsgA-PO-FDM-r17               ENUMERATED {one, two, four, eight}
OPTIONAL,
    dlPathlossRSRP-r17                RSRP-Range
OPTIONAL,
    intendedSIBs-r17                  SEQUENCE (SIZE (1..maxSIB)) OF SIB-Type-r17
OPTIONAL,
    ssbsForSI-Acquisition-r17         SEQUENCE (SIZE (1..maxNrofSSBs-r16)) OF SSB-
Index            OPTIONAL,
```

TABLE 3-continued

```
    msgA-PUSCH-PayloadSize-r17         BIT STRING (SIZE (5))
OPTIONAL,
    onDemandSISuccess-r17              ENUMERATED {true}
OPTIONAL
    ]]
}
PerRAInfoList-r16 ::=      SEQUENCE (SIZE (1..200)) OF PerRAInfo-r16
PerRAInfoList-v1660 ::=    SEQUENCE (SIZE (1..200)) OF PerRACSI-RSInfo-v1660
PerRAInfo-r16 ::=                   CHOICE {
    perRASSBInfoList-r16                PerRASSBInfo-r16,
    perRACSI-RSInfoList-r16             PerRACSI-RSInfo-r16
}
PerRASSBInfo-r16 ::=             SEQUENCE {
    ssb-Index-r16                        SSB-Index,
    numberOfPreamblesSentOnSSB-r16       INTEGER (1..200),
    perRAAttemptInfoList-r16             PerRAAttemptInfoList-r16
}
PerRACSI-RSInfo-r16 ::=          SEQUENCE {
    csi-RS-Index-r16                     CSI-RS-Index,
    numberOfPreamblesSentOnCSI-RS-r16    INTEGER (1..200)
}
PerRACSI-RSInfo-v1660 ::=     SEQUENCE {
    csi-RS-Index-v1660                       INTEGER (1..96)            OPTIONAL
}
PerRAAttemptInfoList-r16 ::=     SEQUENCE (SIZE (1..200)) OF PerRAAttemptInfo-r16
PerRAAttemptInfo-r16 ::=         SEQUENCE {
    contentionDetected-r16               BOOLEAN                   OPTIONAL,
    dlRSRPAboveThreshold-r16             BOOLEAN                   OPTIONAL,
    ...,
    [[
    fallbackToFourStepRA-r17             ENUMERATED {true}         OPTIONAL
    ]]
}
```

| RA-Report field descriptions |
| --- | cellID
This field indicates the CGI of the cell in which the associated random access procedure was performed.
contentionDetected
This field is used to indicate that contention was detected for the transmitted preamble in the given random access attempt or not. This field is not included when the UE performs random access attempt is using contention free random-access resources or when the raPurpose is set to requestForOtherSI or when the RA attempt is a 2-step RA attempt and fallback to 4-step RA did not occur (i.e. fallbackToFourStepRA is not included).
csi-RS-Index, csi-RS-Index-v1660
This field is used to indicate the CSI-RS index corresponding to the random access attempt.
If the random access procedure is for beam failure recovery, the field indicates the NZP-CSI-RS-ResourceId. For CSI-RS index larger than maxNrofCSI-RS-ResourcesRRM-1, the index value is the sum of csi-RS-Index (without suffix) and csi-RS-Index-v1660.
dlPathlossRSRP
Measured RSRP of the DL pathloss reference obtained at the time of RA_Type selection stage of the RA procedure as captured in TS 38.321 [3].
dlRSRPAboveThreshold
In 4 step random access procedure, this field is used to indicate whether the DL beam (SSB) quality associated to the random access attempt was above or below the threshold rsrp-ThresholdSSB in beamFailureRecoveryConfig in UL BWP configuration of UL BWP selected for random access procedure initiated for beam failure recovery; Otherwise, rsrp-ThresholdSSB in rach-ConfigCommon in UL BWP configuration of UL BWP selected for random access procedure.
In 2 step random access procedure, this field is used to indicate whether the DL beam (SSB) quality associated to the random access attempt was above or below the threshold msgA-RSRP-ThresholdSSB in rach-ConfigCommonTwoStepRA in UL BWP configuration of UL BWP selected for random access procedure.
fallbackToFourStepRA
This field indicates if a fallback indication in MsgB is received (according to TS 38.321 [3]) for the 2-step random access attempt.
intendedSIBs
This field indicates the SIB(s) the UE wanted to receive as a result of the on demand SI request (when the RA procedure is a used as a SI request) initiated by the UE. That is, it indicates the one(s) of the SIB(s) in the SI message(s) requested to be broadcast that the UE was interested in.
msg1-SCS-From-prach-ConfigurationIndex
This field is set by the UE with the corresponding SCS for CBRA as derived from the prach-ConfigurationIndex in RACH-ConfigGeneric when the msg1-SubcarrierSpacing is absent; otherwise, this field is absent.
msg1-SCS-From-prach-ConfigurationIndexCFRA
This field is set by the UE with the corresponding SCS for CFRA as derived from the prach-ConfigurationIndex in RACH-ConfigGeneric when the msg1-SubcarrierSpacing is absent; otherwise, this field is absent.

TABLE 3-continued msgA-PUSCH-PayloadSize
This field indicates the size of the overall payload available in the UE buffer at the time of initiating
the 2 step RA procedure. The value refers to the index of TS 38.321 [3], table 6.1.3.1-1,
corresponding to the UE buffer size.
msgA-RO-FDM
This field indicates the number of msgA PRACH transmission occasions Frequency-Division
Multiplexed in one time instance for the PRACH resources configured for 2-step CBRA..
msgA-RO-FDMCFRA
This field indicates the number of msgA PRACH transmission occasions Frequency-Division
Multiplexed in one time instance for the PRACH resources configured for 2-step CFRA.
msgA-RO-FrequencyStart
This field indicates the lowest resource block of the contention based random-access resources for
2-step CBRA in the random-access procedure. The indication has the form of the offset of the lowest
PRACH transmissions occasion with respect to PRB 0 in the frequency domain.
msgA-RO-FrequencyStartCFRA
This field indicates the lowest resource block of the contention free random-access resources for the
2-step CFRA in the random-access procedure. The indication has the form of the offset of the lowest
PRACH transmissions occasion with respect to PRB 0 in the frequency domain.
msgA-SCS-From-prach-ConfigurationIndex
This field is set by the UE with the corresponding SCS as derived from the msgA-PRACH-
ConfigurationIndex in RACH-ConfigGenericTwoStepRA (see tables Table 6.3.3.1-1, Table 6.3.3.1-2,
Table 6.3.3.2-2 and Table 6.3.3.2-3, TS 38.211 [16]) when the msgA-SubcarrierSpacing is absent
and when only 2-step random-access resources are available in the UL BWP used in the random-
access procedure; otherwise, this field is absent.
numberOfPreamblesSentOnCSI-RS
This field is used to indicate the total number of successive RA preambles that were transmitted on
the corresponding CSI-RS.
numberOfPreamblesSentOnSSB
This field is used to indicate the total number of successive RA preambles that were transmitted on
the corresponding SS/PBCH block.
onDemandSISuccess
This field is set to true when the RA report entry is included because of either msg1 based on
demand SI request or msg3 based on demand SI request and if the on-demand SI request is
successful. Otherwise, the field is absent.
perRAAttemptInfoList
This field provides detailed information about a random access attempt.
perRACSI-RSInfoList
This field provides detailed information about the successive random access attempts associated to
the same CSI-RS.
perRASSBInfoList
This field provides detailed information about the successive random access attempts associated to
the same SS/PBCH block.
ra-InformationCommon
This field is used to provide information on random access attempts. This field is mandatory present.
raPurpose
This field is used to indicate the RA scenario for which the RA report entry is triggered. The RA
accesses associated to Initial access from RRC_IDLE, RRC re-establishment procedure, transition
from RRC-INACTIVE. The indicator beamFailureRecovery is used in case of successful beam failure
recovery related RA procedure in the SpCell [3]. The indicator reconfigurationWithSync is used if the
UE executes a reconfiguration with sync. The indicator ulUnSynchronized is used if the random
access procedure is initiated in a SpCell by DL or UL data arrival during RRC_CONNECTED when
the timeAlignmentTimer is not running in the PTAG or if the RA procedure is initiated in a serving cell
by a PDCCH order [3]. The indicator schedulingRequestFailure is used in case of SR failures [3].
The indicator noPUCCHResourceAvailable is used when the UE has no valid SR PUCCH resources
configured [3]. The indicator requestForOtherSI is used for MSG1 based on demand SI request. The
indicator msg3RequestForOtherSI is used in case of MSG3 based SI request. The field can also be
used for the SCG-related RA-Report when the raPurpose is set to beamFailureRecovery,
reconfigurationWithSync, ulUnSynchronized, schedulingRequestFailure and
noPUCCHResourceAvailable.
spCellID
This field is used to indicate the CGI of the SpCell of the cell group associated to the SCell in which
the associated random access procedure was performed. If the UE performs RA procedure on a
SCell associated to the MCG, then this field is set to the CGI of the PCell and if the UE performs RA
procedure on a SCell associated to the SCG, then this field is set to the CGI of the PSCell.
Otherwise, the field is absent.
ssb-Index
This field is used to indicate the SS/PBCH index of the SS/PBCH block corresponding to the random
access attempt.
ssbsForSI-Acquisition
This field indicates the SSB(s) (in the form of SSB index(es)) that the UE used to receive the
requested SI message(s). The field is present if the purpose of the random access procedure was to
request on-demand SI (i.e. if the raPurpose is set to requestForOtherSI or msg3RequestForOtherSI).
Otherwise, the field is absent.

Figure 1I:
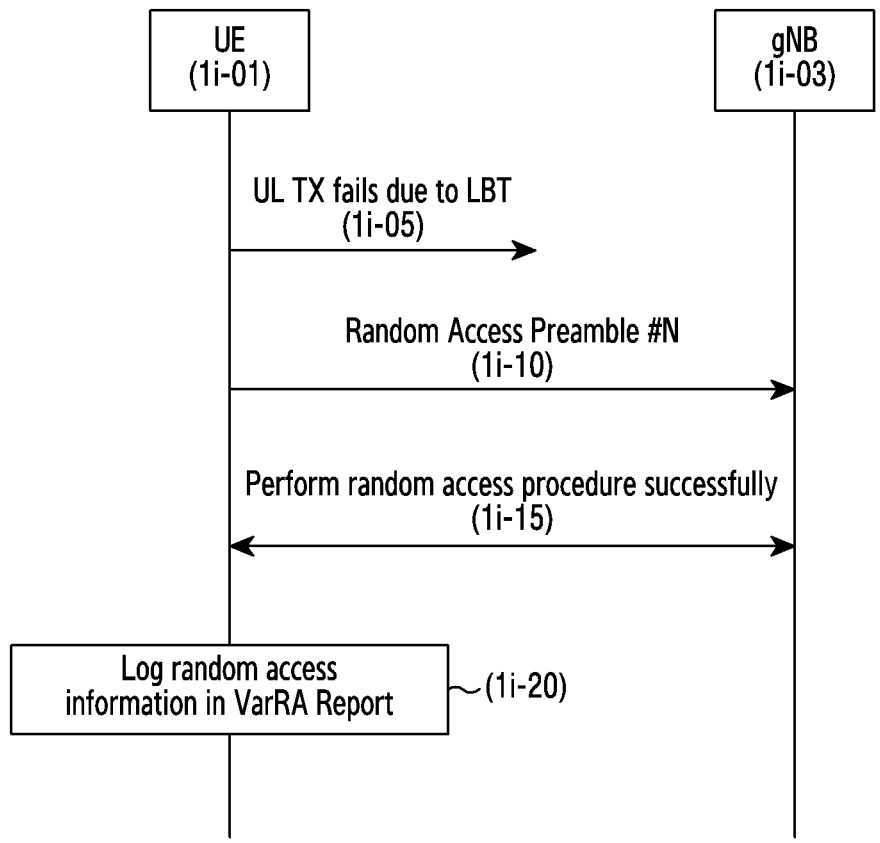
FIG. 1I illustrates a method of logging LBT failure information in an RA report when a terminal detects an uplink LBT failure problem according to an embodiment of the disclosure.

FIG. 1I illustrates a method of logging LBT failure information in an RA report when a terminal detects an uplink LBT failure problem according to an embodiment of the disclosure.

Referring to FIG. 1I, a terminal 1i-01 may perform random access at a base station 1i-03 operating in the unlicensed band.

In operation 1i-05, the terminal 1i-01 may not be able to transmit uplink due to LBT failure when performing uplink transmission. For example, the preamble and Msg 3 may not be transmitted from the physical layer device to the base station 1i-03. The disclosure proposes that the terminal 1i-01 logs information about the number of LBT failures occurred in the RA-Report to indicate uplink transmission failure due to LBT failure.

Figure 1J:
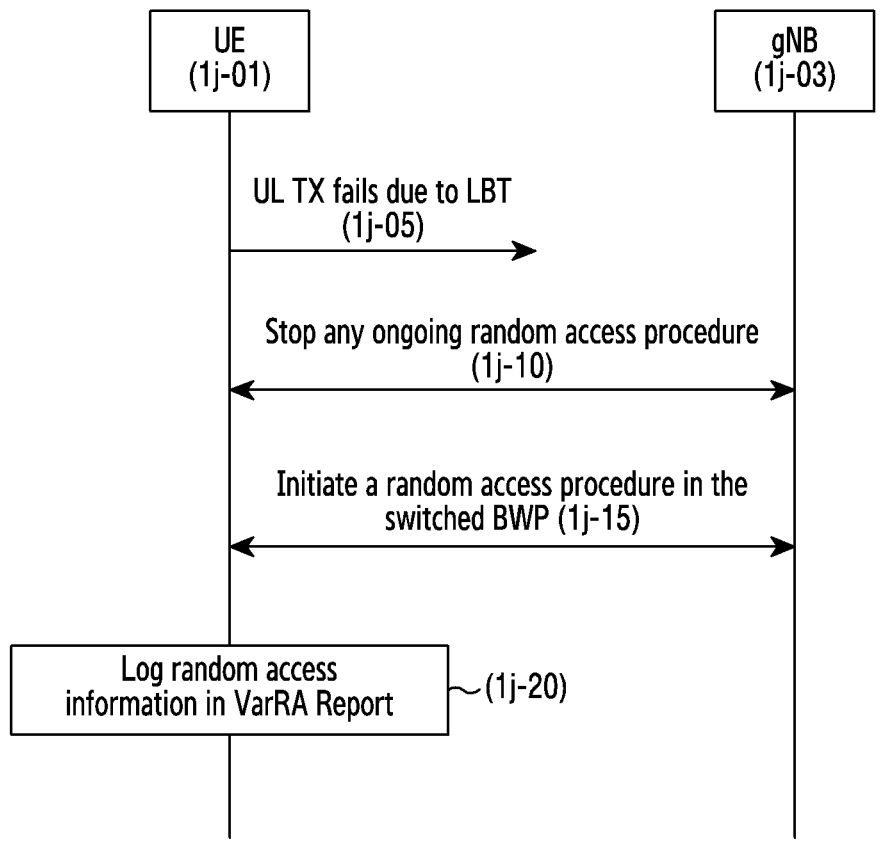
FIG. 1J illustrates a method of logging LBT failure information in an RA report when a terminal detects an uplink LBT failure problem according to an embodiment of the disclosure.

FIG. 1J illustrates a method of logging LBT failure information in an RA report when a terminal detects an uplink LBT failure problem according to an embodiment of the disclosure.

Referring to FIG. 1J, a terminal 1j-01 may perform random access at a base station 1j-03 operating in the unlicensed band.

In operation 1j-05, the terminal 1j-01 may not be able to transmit uplink due to LBT failure when performing uplink transmission. For example, the preamble and Msg 3 may not be transmitted from the physical layer device to the base station 1j-03.

In operation 1j-10, the terminal 1j-01 may stop random access being performed due to consistent LBT failure. When the conditions shown in Table 4 below are satisfied, the terminal 1j-01 may stop the random access being performed.

TABLE 4

For each activated Serving Cell configured with lbt-FailureRecoveryConfig, the MAC entity shall:
   1> if LBT failure indication has been received from lower layers:
       2> start or restart the lbt-FailureDetectionTimer;
       2> increment LBT_COUNTER by 1;
       2> if LBT_COUNTER >= lbt-FailureInstanceMaxCount:
           3> trigger consistent LBT failure for the active UL BWP in this Serving Cell;
           3> if this Serving Cell is the SpCell:
               4> if consistent LBT failure has been triggered in all UL BWPs configured with PRACH occasions
                   on same carrier in this Serving Cell:
                   5> indicate consistent LBT failure to upper layers.
               4> else:
                   5> stop any ongoing Random Access procedure in this Serving Cell;

In operation 1i-10, due to the undetected LBT failure, the terminal 1i-01 may transmit the uplink.

In operation 1i-15, the terminal 1i-01 may successfully perform a random access procedure with the base station 1i-03.

In operation 1i-20, the terminal 1i-01 may store random access information in VarRA-Report. In the disclosure, the RA-Report may include information on the number of LBT failures or the number of uplink transmissions failures due to an LBT failure. The RA-Report may include RA-InformationCommon. The disclosure proposes that the terminal stores only information about successful uplink transmission because no LBT failure is detected in the perRAInfoList stored in RA-InformationCommon. For example, since perRAInfoList logs information about the beam used for transmission and the number of transmissions, the perRAInfoList information is not needed when uplink transmission is failed due to LBT failure. In addition, the RA-Report may include separate frequency information or BWP information in case of uplink transmission failure due to LBT failure. That is, rather than the frequency information or BWP information stored in RA-InformationCommon, at least one of the frequency information, channel information, and BWP information where the LBT failure occurred may be included in a new field. For reference, the new field may refer to at least one of the fields stored in RA-InformationCommon. Alternatively, when consistent LBT failure is detected in one or multiple UL BWPs, information on the number of LBT failures for each BWP may also be stored in the RA-Report. For reference, the description above may also be applied to the following variables.
    VarConnEstFailReport: It includes the connection establishment failure and/or connection resume failure information
    VarRLF-Report: It includes the radio link failure information or handover failure information In operation 1j-15, the terminal 1j-01 may initiate a new random access procedure by switching the BWP according to the procedure in Table 5 below.

TABLE 5

5> switch the active UL BWP to a UL BWP, on same carrier in this Serving Cell, configured with PRACH occasion and for which consistent LBT failure has not been triggered;

In operation 1j-20, the terminal 1j-01 may store random access information due to consistent LBT failure in VarRA-Report. The disclosure proposes that the terminal 1j-01 stores, in the RA-Report, at least one of information on the number of LBT failures and channel information (or frequency information or BWP information) in which the LBT failure is detected. For reference, the channel information in which LBT failure is detected may refer to a BWP ID or at least one piece of information stored in RA-InformationCommon. For reference, the channel information does not refer to RA-InformationCommon, but a new field. Therefore, the disclosure proposes the terminal 1j-01 including a new field other than RA-InformationCommon. Due to the reason described above, perRAInfoList stored in RA-InformationCommon may not be stored in RA-Report. For reference, when a new random access procedure is initiated due to consistent LBT failure, the corresponding information may be stored in one RA-Report. This is for the terminal to efficiently manage the VarRA-Report because the terminal may only log a maximum of 8 RA-Reports in the VarRA-Report. Alternatively, information indicating consistent LBT failures may be stored in raPurpose. For reference, the description above may also be applied to the following variables.
    VarConnEstFailReport: It includes the connection establishment failure and/or connection resume failure information VarRLF-Report: It includes the radio link failure information or handover failure information FIG. 1K illustrates a method of logging LBT failure information in an RA report when a terminal detects an uplink LBT failure problem according to an embodiment of the disclosure.

Figure 1K:
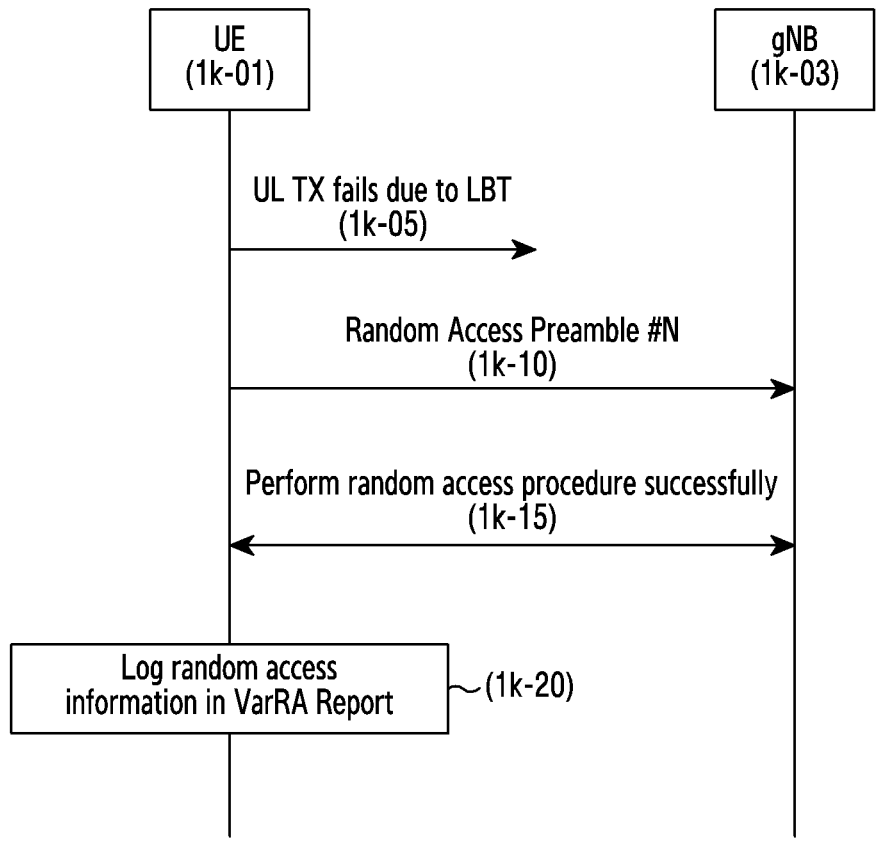
FIG. 1K illustrates a method of logging LBT failure information in an RA report when a terminal detects an uplink LBT failure problem according to an embodiment of the disclosure.

Referring to FIG. 1K, a terminal 1k-01 may perform random access at a base station 1k-03 operating in the unlicensed band.

In operation 1k-05, the terminal 1k-01 may not be able to transmit uplink due to LBT failure when performing uplink transmission. For example, the preamble and Msg 3 may not be transmitted from the physical layer device to the base station 1k-03. The disclosure proposes that the terminal 1k-01 introduces a new perRAInfoListLBT (or perRAInfoList-v18xx) in RA-Report to indicate uplink transmission failure due to LBT failure. The new perRAInfoListLBT may have the same size and order as perRAInfoList-r16 (or perRAInfoList-v1660). In this case, information to indicate uplink transmission failure due to an LBT failure occurring in certain information among information stored in perRAInfoList-r16 (or perRAInfoList-v1660) may be stored in the perRAInfoListLBT. Alternatively, the new perRAInfoListLBT may have a size and order independent of perRAInfoList-r16 (or perRAInfoList-v1660). In this case, information to indicate uplink transmission failure due to an LBT failure occurring in certain perRAInfo-r16 (or any perRACSI-RSInfo-v1660) may be included. For example, when uplink transmission is failed due to LBT failure in the third perRAInfo among perRAInfoList-r16, an index indicating the corresponding perRAInfo may be included, or an indicator indicating an index and uplink transmission failure may be included.

In operation 1k-10, due to the undetected LBT failure, the terminal 1k-01 may transmit the uplink.

In operation 1k-15, the terminal 1k-01 may successfully perform a random access procedure with the base station 1k-03.

In operation 1k-20, the terminal 1k-01 may store random access information in VarRA-Report. The disclosure proposes that the terminal stores, in perRAInfoList stored in RA-InformationCommon, information on successfully transmitted uplink together with information on uplink transmission failed due to LBT failure. The base station 1k-03 may further identify uplink transmission failure information due to LBT failure, through the above-described perRAInfoListLBT. Therefore, the base station 1k-03 may ignore the information about LBT failure included in perRAInfoList. For reference, perRAInfoListLBT information and the description above may also be applied to the following variables.

VarConnEstFailReport: It includes the connection establishment failure and/or connection resume failure information VarRLF-Report: It includes the radio link failure information or handover failure information FIG. 1L is a diagram illustrating the internal structure of a terminal according to an embodiment of the disclosure.

Figure 1L:
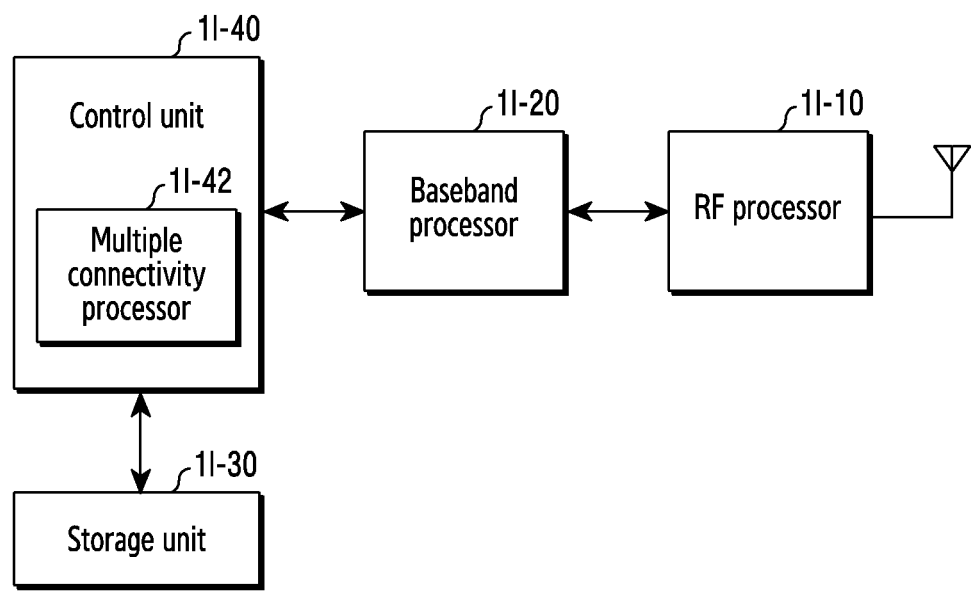
FIG. 1L is a diagram illustrating the internal structure of a terminal according to an embodiment of the disclosure.

Referring to the FIG. 1L, the terminal includes a radio frequency (RF) processing unit 1l-10, a baseband processing unit 1l-20, a storage unit 1l-30, and a controller 1l-40.

The RF processing unit 1l-10 performs functions of transmitting and receiving signals through a radio channel, such as band conversion and amplification of signals. That is, the RF processing unit 1l-10 upconverts the baseband signal provided from the baseband processing unit 1l-20 into an RF band signal and transmits the RF band signal through an antenna, and downconverts the RF band signal received through the antenna into a baseband signal. For example, the RF processing unit 1l-10 may include a transmission filter, a reception filter, an amplifier, a mixer, an oscillator, a digital to analog convertor (DAC), an analog to digital convertor (ADC), etc. In FIG. 1L, only one antenna is shown, but the terminal may be equipped with multiple antennas. In addition, the RF processing unit 1l-10 may include multiple RF chains. Furthermore, the RF processing unit 1l-10 may perform beamforming. For beamforming, the RF processing unit 1l-10 may adjust the phase and size of each signal transmitted and received through multiple antennas or antenna elements. In addition, the RF processing unit may perform MIMO and may receive multiple layers when performing MIMO operations.

The baseband processing unit 1l-20 performs a function of conversion between a baseband signal and a bitstream according to the physical layer specifications of a system. For example, in data transmission, the baseband processing unit 1l-20 generates complex symbols by encoding and modulating the transmission bitstream. In addition, in data reception, the baseband processing unit 1l-20 restores the received bitstream by demodulating and decoding the baseband signal provided from the RF processing unit 1l-10. For example, in the case of following the orthogonal frequency division multiplexing (OFDM) method, the baseband processing unit 1l-20 generates complex symbols during data transmission by encoding and modulating the transmission bitstream, maps the complex symbols to subcarriers, and then configures OFDM symbols through inverse fast Fourier transform (IFFT) operation and cyclic prefix (CP) insertion. In addition, during data reception, the baseband processing unit 1l-20 divides the baseband signal provided from the RF processing unit 1l-10 into OFDM symbol units, restores the signals, mapped to subcarriers, via fast Fourier transform (FFT), and then restore the received bitstream via demodulation and decoding.

The baseband processing unit 1l-20 and the RF processing unit 1l-10 transmit and receive signals as described above. Accordingly, the baseband processing unit 1l-20 and the RF processing unit 1l-10 may be referred to as a transmitter, a receiver, a transceiver, or a communication unit. Furthermore, at least one of the baseband processing unit 1l-20 and the RF processing unit 1l-10 may include multiple communication modules to support multiple different wireless access technologies. In addition, at least one of the baseband processing unit 1l-20 and the RF processing unit 1l-10 may include different communication modules to process signals in different frequency bands. For example, different wireless access technologies may include wireless LAN (e.g., IEEE 802.11), cellular network (e.g., LTE), etc. In addition, different frequency bands may include a super high frequency (SHF) (e.g., 2.NRHz, NRHz) band and a millimeter wave (mm wave) (e.g., 60 GHz) band.

The storage unit 1l-30 stores data such as basic programs, application programs, and configuring information, for operation of the terminal. In particular, the storage unit 1l-30 may store information related to a second access node that performs wireless communication by using a second wireless access technology. In addition, the storage unit 1l-30 provides stored data according to the request of the controller 1l-40.

The controller 1l-40 controls the overall operations of the terminal. For example, the controller 1l-40 transmits and receives signals through the baseband processing unit 1l-20 and the RF processing unit 1l-10. In addition, the controller 1l-40 logs data into the storage unit 1l-30 and reads the data.

To this end, the controller 1*l*-40 may include at least one processor (e.g., a multiple connectivity processor 1*l*-42). For example, the controller 1*l*-40 may include a communication processor (CP) that performs control for communication, and an application processor (AP) that controls upper layers such as application programs. In addition, according to an embodiment of the disclosure, the controller 1*l*-40 may include a multi-connection processing unit 1*l*-42 configured to process a process operating in a multi-connection mode. In addition, at least one component within the terminal may be implemented as one chip.

Figure 1M:
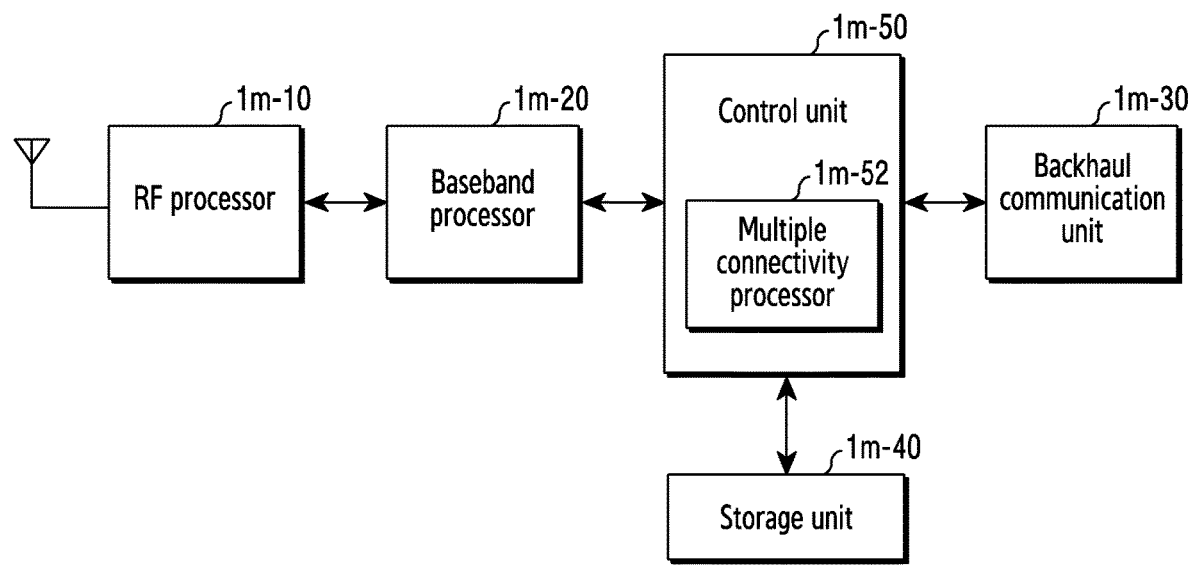
FIG. 1M is a diagram illustrating a configuration of an NR base station according to an embodiment of the disclosure.

FIG. 1M is a diagram illustrating a configuration of an NR base station according to an embodiment of the disclosure.

Referring to FIG. 1M, the base station includes an RF processing unit 1*m*-10, a baseband processing unit 1*m*-20, a backhaul communication unit 1*m*-30, a storage unit 1*m*-40, and a controller 1*m*-50.

The RF processing unit 1*m*-10 performs functions for transmitting and receiving signals via a wireless channel, such as band conversion and amplification of signals. That is, the RF processing unit 1*m*-10 upconverts the baseband signal provided from the baseband processing unit 1*m*-20 into an RF band signal and transmits the RF signal through an antenna, and downconverts the RF band signal received through the antenna into a baseband signal. For example, the RF processing unit 1*m*-10 may include a transmission filter, a reception filter, an amplifier, a mixer, an oscillator, a DAC, an ADC, etc. In FIG. 1M, only one antenna is shown, but the first access node may be equipped with multiple antennas. In addition, the RF processing unit 1*m*-10 may include multiple RF chains. Furthermore, the RF processing unit 1*m*-10 may perform beamforming. For beamforming, the RF processing unit 1*m*-10 may adjust the phase and size of each signal transmitted and received through multiple antennas or antenna elements. The RF processing unit may perform downward MIMO operation by transmitting one or more layers.

The baseband processing unit 1*m*-20 performs a function of conversion between a baseband signal and a bitstream according to the physical layer standard of the first wireless access technology. For example, in data transmission, the baseband processing unit 1*m*-20 generates complex symbols by encoding and modulating the transmission bitstream. In addition, in data reception, the baseband processing unit 1*m*-20 restores the received bitstream by demodulating and decoding the baseband signal provided from the RF processing unit 1*m*-10. For example, in the case of following the OFDM method, the baseband processing unit 1*m*-20 generates complex symbols during data transmission by encoding and modulating the transmission bitstream, maps the complex symbols to subcarriers, and then configures OFDM symbols through IFFT operation and CP insertion. In addition, during data reception, the baseband processing unit 1*m*-20 divides the baseband signal provided from the RF processing unit 1*m*-10 into OFDM symbol units, restores the signals, mapped to subcarriers, via FFT operation, and then restore the received bitstream via demodulation and decoding. The baseband processing unit 1*m*-20 and the RF processing unit 1*m*-10 transmit and receive signals as described above. Accordingly, the baseband processing unit 1*m*-20 and the RF processing unit 1*m*-10 may be referred to as a transmitter, a receiver, a transceiver, a communication unit, or a wireless communication unit.

The backhaul communication unit 1*m*-30 provides an interface for performing communication with other nodes in a network. That is, the backhaul communication unit 1*m*-30 converts the bitstreams transmitted from the main base station to other nodes, such as auxiliary base stations and core networks, into a physical signal, and converts the physical signal received from another node into bitstreams.

The storage unit 1*m*-40 stores data such as basic programs, applications, and configuring information, for the operation of the main base station. In particular, the storage unit 1*m*-40 may store information about bearers assigned to the connected terminal, measurement results reported from the connected terminal, and the like. In addition, the storage unit 1*m*-40 may store information that serves as a criterion for determining whether to provide multiple connections to the terminal or stop the connections. In addition, the storage unit 1*m*-40 provides stored data according to the request of the controller 1*m*-50.

The controller 1*m*-50 controls the overall operations of the main base station. For example, the controller 1*m*-50 transmits and receives signals through the baseband processing unit 1*m*-20 and the RF processing unit 1*m*-10 or through the backhaul communication unit 1*m*-30. In addition, the controller 1*m*-50 logs data into the storage unit 1*m*-40 and reads the data. To this end, the controller 1*m*-50 may include at least one processor (e.g., a multiple connectivity processor 1*m*-52). The base station may perform signal transmission and reception with the terminal by using the baseband processing unit 1*m*-20 and the RF processing unit 1*m*-10, and the signals may include control information and data.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents. Furthermore, the above respective embodiments may be employed in combination, as necessary. For example, a part of one embodiment of the disclosure may be combined with a part of another embodiment to operate a base station and a terminal. Furthermore, other variant embodiments based on the technical idea of the above-described embodiments may also be implemented in other systems such as LTE, 5G, or NR systems.

What is claimed is:

1. An operation method of a terminal in a wireless communication system, the method comprising:
   attempting to transmit a preamble in a random access procedure by performing a listen-before-talk (LBT) via an unlicensed spectrum;
   generating a random access report based on the attempting to transmit the preamble; and
   transmitting, to a base station, the random access report,
   wherein the random access report includes perRAInfoListLBT, and
   wherein a random access information included in the perRAInfoListLBT includes information on random access failure due to LBT failure.

2. The method of claim 1,
   wherein the random access report comprises a number of one or more failures of the attempting to transmit the preamble, and
   wherein a counter for the number is incremented by 1, in response to a failure of the attempting to transmit the preamble according to the LBT failure being detected.

3. The method of claim 1, further comprising:
   determining a consistent LBT failure based on a counter exceeding a predetermined value;
   stopping the random access procedure;
   generating information on a BWP where the consistent LBT failure is determined based on a consistent LBT failure being determined; and
   performing a new random access procedure by switching to a new bandwidth part (BWP).

4. The method of claim 3,
   wherein the information on the BWP where the consistent LBT failure is determined is included in the random access report.

5. The method of claim 4, wherein the information on the BWP where the consistent LBT failure is determined includes at least one of location and BWP information, or subcarrier spacing.

6. The method of claim 1, further comprising:
   based on detecting a radio link failure (RLF), transmitting, to the base station, the random access report.

7. A terminal in a wireless communication system, the terminal comprising:
   a transceiver; and
   a controller operably connected to the transceiver and being configured to:
      attempt to transmit a preamble in a random access procedure by performing a listen-before-talk (LBT) via an unlicensed spectrum,
      generate a random access report based on the attempt to transmit the preamble, and
      transmit, to a base station, the random access report,
   wherein the random access report includes perRAInfoListLBT, and
   wherein a per random access information included in the perRAInfoListLBT includes information on random access failure due to LBT failure.

8. The terminal of claim 7,
   wherein the random access report comprises a number of one or more failures of the attempting to transmit the preamble, and
   wherein a counter for the number is incremented by 1, in response to a failure of the attempt to transmit the preamble according to the LBT failure being detected.

9. The terminal of claim 7, wherein the controller is further configured to:
   determine a consistent LBT failure, in case that a counter exceeds a predetermined value,
   stop the random access procedure,
   generate information on a BWP where the consistent LBT failure is determined, in case that a consistent LBT failure is determined, and
   perform a new random access procedure by switching to a new bandwidth part (BWP).

10. The terminal of claim 9,
    wherein the information on the BWP where the consistent LBT failure is determined is included in the random access report.

11. The terminal of claim 10, wherein the information on the BWP where the consistent LBT failure is determined includes at least one of location and BWP information, or subcarrier spacing.

12. The terminal of claim 7, wherein the controller is further configured to:
    in case that a radio link failure (RLF) is detected, transmit, to the base station, the random access report.

* * * * *